(12) United States Patent
Fiorani et al.

(10) Patent No.: US 11,678,388 B2
(45) Date of Patent: Jun. 13, 2023

(54) BEARER SETUP AND ESTABLISHMENT USING TUNNEL ENDPOINT IDENTIFIERS (TEIDS)

(71) Applicant: Telefonaktiebolaget LM Ericsson (publ), Stockholm (SE)

(72) Inventors: Matteo Fiorani, Solna (SE); Angelo Centonza, Stockholm (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 150 days.

(21) Appl. No.: 16/761,069

(22) PCT Filed: Nov. 14, 2018

(86) PCT No.: PCT/SE2018/051166
§ 371 (c)(1),
(2) Date: May 1, 2020

(87) PCT Pub. No.: WO2019/098918
PCT Pub. Date: May 23, 2019

(65) Prior Publication Data
US 2020/0275498 A1    Aug. 27, 2020

Related U.S. Application Data

(60) Provisional application No. 62/586,944, filed on Nov. 16, 2017.

(51) Int. Cl.
*H04W 76/12*  (2018.01)
*H04W 76/11*  (2018.01)
*H04W 92/20*  (2009.01)

(52) U.S. Cl.
CPC ............ *H04W 76/12* (2018.02); *H04W 76/11* (2018.02); *H04W 92/20* (2013.01)

(58) Field of Classification Search
CPC ..... H04W 76/12; H04W 76/11; H04W 92/20; H04W 76/22; H04W 28/10; H04W 76/15;
(Continued)

(56) References Cited

U.S. PATENT DOCUMENTS

2013/0176897 A1    7/2013  Wang et al.
2016/0028585 A1    1/2016  Wager et al.
(Continued)

FOREIGN PATENT DOCUMENTS

CN    109246747 A    1/2019
RU    2628207 C2    8/2017
(Continued)

OTHER PUBLICATIONS

WO 2018029932 A1 (Year: 2017).*
(Continued)

*Primary Examiner* — Rushil Parimal Sampat
(74) *Attorney, Agent, or Firm* — Murphy, Bilak & Homiller, PLLC

(57) ABSTRACT

According to certain embodiments, a method for allocating TEIDs by a CU-CP of a network node includes receiving, from a CU-UP, at least one uplink TEID (UL TEID) associated with a DRB. The at least one UL TEID is sent to a distributed unit (DU). At least one downlink TEID (DL TEID) associated with the DRB is received from the DU. The at least one DL TEID associated with the DRB is then sent to the CU-UP.

23 Claims, 18 Drawing Sheets

(58) Field of Classification Search
CPC ... H04W 84/20; H04W 92/045; H04W 36/14; H04W 36/0055; H04W 92/04; H04L 47/24
See application file for complete search history.

(56) References Cited

U.S. PATENT DOCUMENTS

| | | | |
|---|---|---|---|
| 2017/0208634 A1 | 7/2017 | Bharatia et al. | |
| 2018/0324752 A1 | 11/2018 | Kim | |
| 2019/0132772 A1* | 5/2019 | Kim | H04W 28/0252 |
| 2019/0150220 A1* | 5/2019 | Byun | H04W 68/02 370/329 |
| 2019/0320476 A1* | 10/2019 | Wang | H04W 76/15 |
| 2020/0053814 A1* | 2/2020 | Minokuchi | H04W 28/10 |
| 2020/0178326 A1* | 6/2020 | Sirotkin | H04W 76/12 |
| 2021/0297916 A1* | 9/2021 | Futaki | H04W 36/0055 |

FOREIGN PATENT DOCUMENTS

| | | |
|---|---|---|
| WO | 2015046911 A1 | 4/2015 |
| WO | 2018174683 A1 | 9/2018 |
| WO | 2019031915 A1 | 2/2019 |

OTHER PUBLICATIONS

WO 2018066702 A1 (Year: 2017).*
WO 2018/062949 A1 (Year: 2017).*
WO 2018/080218 A1 (Year: 2017).*
U.S. Appl. No. 62/521,958 (Year: 2017).*
"3GPP TS 29.274 V0.2.0", 3rd Generation Partnership Project; Technical Specification Group Core Network and Terminals; 3GPP Evolved Packet System; Evolved GPRS Tunnelling Protocol (eGTP) for EPS; Stage 3 (Release 8), Apr. 2008, pp. 1-38.
"CP-UP separation: interface functions", 3GPP TSG RAN WG3 Meeting #97, R3-173275, Berlin, Germany, Aug. 21-25, 2017, pp. 1-3.
"Discussions on cell information in UE context setup procedure over F1", 3GPP TSG-RAN WG3 Meeting #97bis, R3-173854, Prague, Czech, Oct. 9-13, 2017, pp. 1-3.
"Enhancements for intra CU-CP handover in NG-RAN with separated CP and UP", 3GPP TSG RAN WG3 Meeting #97bis, R3-173806, Prague, Czech, Oct. 9-13, 2017, pp. 1-6.
"Further clarification of architecture", 3GPP TSG-RAN WG3 Meeting #97bis, R3-173570, Prague, Czech Republic, Oct. 9-13, 2017, pp. 1-3.
"Idle to connected state transition with E1", 3GPP TSG RAN WG3 Meeting #97b, Tdoc R3-173997, Prague, Czech Republic, Oct. 9-13, 2017, pp. 1-5.
"Resolution of E1 open issues—interface design", 3GPP TSG-RAN WG3 #97, Tdoc R3-173334, Berlin, Germany, Aug. 21-25, 2017, pp. 1-5.
"SgNB addition procedure for CP-UP separation", 3GPP TSG RAN WG3 meeting #97bis, R3-173715, Prague, Czech, Aug. 9-13, 2017, pp. 1-5.
"SgNB addition with E1", 3GPP TSG RAN WG3 Meeting #97bm Tdoc R3-173996, Prague, Czech Republic, Oct. 9-13, 2017, pp. 1-4.
"TNL solution for F1-C", 3GPP TSG RAN WG3 Meeting #97b, Tdoc R3-173959, Prague, Czech Republic, Oct. 9-13, 2017, pp. 1-6.
"UE initial access procedure for CP-UP separation", 3GPP TSG RAN WG3 meeting #97bis, R3-173714, Prague, Czech, Aug. 9-13, 2017, pp. 1-5.
"Xn handover in disaggregated gNB with E1 interface", 3GPP TSG-RAN WG3 #97, Tdopp. c R3-173254, Berlin, Germany, Aug. 21-25, 2017, 1-6.
"E1 interface functions", TSG RAN WG3 Meeting #97b, R3-173994, Prague, Czech Republic, Oct. 9-13, 2017, pp. 1-3.
"Bearer Lists in HO messages", 3GPP TSG RAN WG3 Meeting #59, R3-080173, Sorrento, Italy, Feb. 11-15, 2008, pp. 1-3.
"Idle to connected procedure for GP-UP separation", 3GPP TSG RAN WG3 meeting #97, R3-173131, Berlin, Germany, Aug. 21-25, 2017, pp. 1-4.
"Idle to Connected state transitions in a disaggregated gNB with E1 Interface", 3GPP TSG-RAN WG3 AH #2, R3-172553, Qingdao, P. R. China, Jun. 27-29, 2017, pp. 1-4.
"On Relocation Complete part", 3GPP TSG RAN WG3 Meeting #61, R3-082140, Jeju Island, Korea, Aug. 18-22, 2008, pp. 1-2.
"3GPP TR 38.806 V0.2.0", 3rd Generation Partnership Project; Technical Specification Group Radio Access Network; Study on separation of CP and UP for split option 2 of NR; (Release 15), Oct. 2017, pp. 1-13.
"3GPP TS 23.501 V1.5.0", 3rd Generation Partnership Project; Technical Specification Group Services and System Aspects; System Architecture for the 5G System; Stage 2 (Release 15), Nov. 2017, pp. 1-170.
"3GPP TS 29.060 V15.0.0", 3rd Generation Partnership Project; Technical Specification Group Core Network and Terminals; General Packet Radio Service (GPRS); GPRS Tunnelling Protocol (GTP) across the Gn and Gp interface (Release 15), Sep. 2017, pp. 1-191.
"Xn handover in a disaggregated gNB", 3GPP TSG-RAN WG3 #97; Tdoc R3-173232 (Revision of R3-172520); Berlin, Germany;, Aug. 21-25, 2017, pp. 1-5.
"3GPP TS 38.401 V0.4.1"; 3rd Generation Partnership Project; Technical Specification Group Radio Access Network; NG-RAN; Architecture description (Release 15), Oct. 2017, pp. 1-25.

* cited by examiner

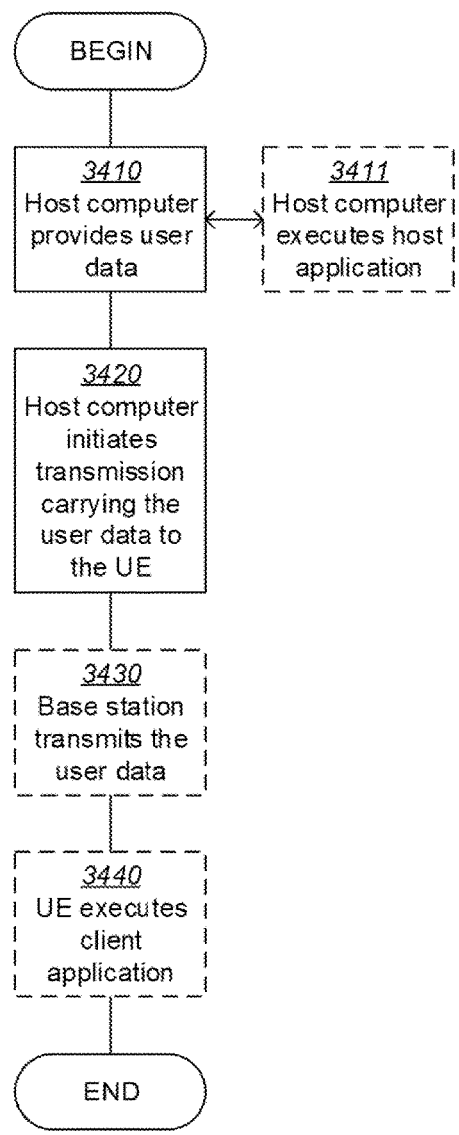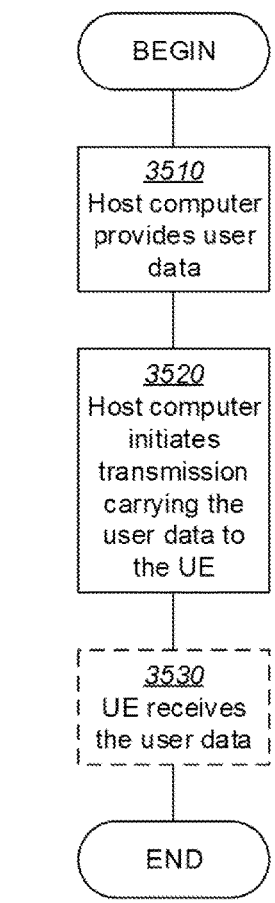
FIGURE 18
FIGURE 19

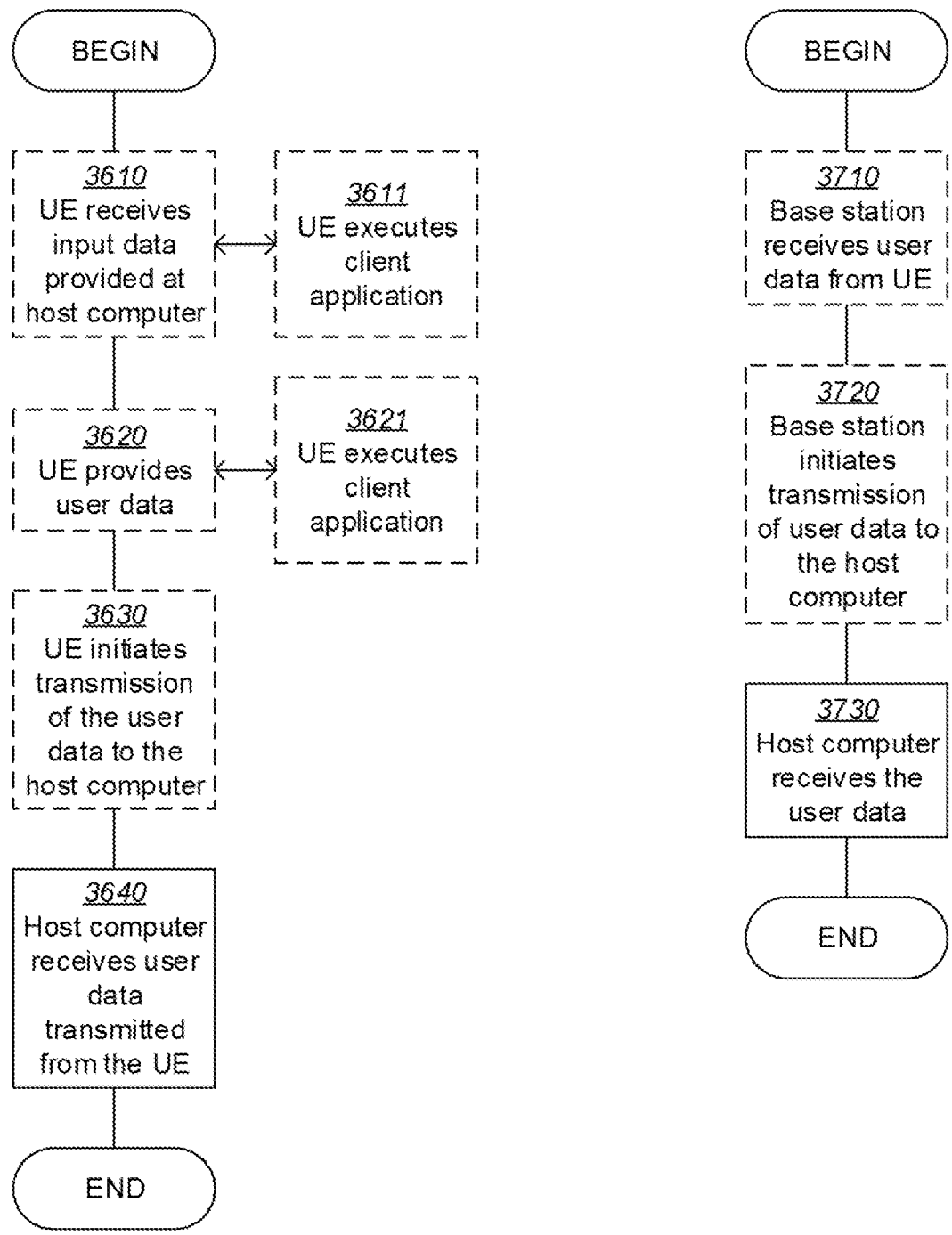

BEARER SETUP AND ESTABLISHMENT USING TUNNEL ENDPOINT IDENTIFIERS (TEIDS)

BACKGROUND

FIG. 1 illustrates the current 5th generation (NG) Radio Access Network (RAN) architecture as described in 3GPP TS 38.401. The NG architecture can be further described as follows:
- The NG-RAN consists of a set of 5th generation base stations (gNodeBs or gNBs) connected to the 5G Core Network (5GC) through the NG.
- An gNB can support Frequency Division Duplexing (FDD) mode, Time Division Duplexing (TDD) mode or dual mode operation.
- gNBs can be interconnected through the Xn interface.
- A gNB may consist of a gNB Central Unit (gNB-CU) and gNB Distributed Units (gNB-DUs).
- A gNB-CU and a gNB-DU is connected via F1 logical interface.
- One gNB-DU is connected to only one gNB-CU.
- NG, Xn and F1 are logical interfaces. For NG-RAN, the NG and Xn-C interfaces for a gNB consisting of a gNB-CU and gNB-DUs, terminate in the gNB-CU. For Dual Connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

The NG-RAN is layered into a Radio Network Layer (RNL) and a Transport Network Layer (TNL). The NG-RAN architecture, which may include the NG-RAN logical nodes and interfaces between them, is defined as part of the RNL. For each NG-RAN interface (i.e., NG, Xn, F1), the related TNL protocol and the functionality are specified. The TNL provides services for user plane transport and signaling transport. In NG-Flex configuration, each gNB is connected to all access mobility functions (AMFs) within an AMF Region. The AMF Region is defined in 3GPP TS 23.501.

The general principles for the specification of the F1 interface are as follows:
- the F1 interface is open;
- the F1 interface supports the exchange of signalling information between the endpoints, in addition the interface supports data transmission to the respective endpoints;
- from a logical standpoint, the F1 is a point-to-point interface between the endpoints (a point-to-point logical interface should be feasible even in the absence of a physical direct connection between the endpoints);
- the F1 interface supports control plane and user plane separation;
- the F1 interface separates Radio Network Layer and Transport Network Layer;
- the F1 interface enable exchanges of UE associated information and non-UE associated information;
- the F1 interface is defined to be future proof to fulfil different new requirements, support new services and new functions;
- one gNB-CU and set of gNB-DUs are visible to other logical nodes as a gNB. The gNB terminates X2, Xn, NG and S1-U interfaces;
- the gNB-CU may be separated in control plane (CP) and user plane (UP).

The 3GPP standard body carried out a study on the separation of the CU into a CU-CP (control plane) entity and a CU-UP (user plane) entity. The agreements from the study are collected in 3GPP TR 38.806. FIG. 2 illustrates an example architecture that separates the CU into a CU-CP and CU-UP as it was being studied in 3GPP TR 38.806.

The architecture studied in TR 38.806 can be further defined as follows:
- A gNB may consist of a CU-CP, multiple CU-UPs and multiple DUs;
- The CU-CP is connected to the DU through the F1-C interface;
- The CU-UP is connected to the DU through the F1-U interface;
- The CU-UP is connected to the CU-CP through the E1 interface;
- One DU is connected to only one CU-CP;
- One CU-UP is connected to only one CU-CP;
- For resiliency, a DU and/or a CU-UP may be connected to multiple CU-CPs by appropriate implementation.
- One DU can be connected to multiple CU-UPs under the control of the same CU-CP;
- One CU-UP can be connected to multiple DUs under the control of the same CU-CP;
- The connectivity between a CU-UP and a DU is established by the CU-CP using e.g., Bearer or UE Context Management functions.
- The CU-CP selects the appropriate CU-UP(s) for the requested services for the UE.

There currently exist certain challenges. For example, the F1-U interface between a DU and a CU-UP is based on the GTP protocol defined in 3GPP TS 29.060. Each connection over the F1-U is mapped to a data radio bearer (DRB) that connects a CU-UP to a UE via a DU (where the DU provides the radio resources for the DRB). To establish a connection between a CU-UP and a DU over the F1-U interface, the DU and the CU-UP need to exchange the GTP tunnel endpoints identifiers (TEID). This allows the DU and CU-UP to unequivocally identify the specific connection (DRB). A mechanism for exchanging TEIDs between the DU and the CU-UP has not been agreed in 3GPP yet.

Currently, 3GPP considers only the case where a CU-UP is connected to only one CU-CP. However, as acknowledged in 3GPP, it is possible to have an implementation where a CU-UP connects to multiple CU-CPs. For this reason, the CU-UP needs to manage TEID allocation. However, there should still be a possibility for the CU-CP to control alone the TEID allocation in case that the CU-UP is connected to only one CU-CP.

SUMMARY

Certain aspects of the present disclosure and their embodiments may provide solutions to these or other challenges. Specifically, methods and systems are provided for exchanging tunnel endpoints identifiers (TEIDs) between a distributed unit (DU) and a central unit-user plane (CU-UP) to establish a connection over the F1-U interface and the corresponding data radio bearers (DRB).

According to certain embodiments, a method for allocating TEIDs by a CU-CP of a network node includes receiving, from a CU-UP, at least one uplink TEID (UL TEID) associated with a DRB. The at least one UL TEID is sent to a distributed unit (DU). At least one downlink TEID (DL TEID) associated with the DRB is received from the DU. The at least one DL TEID associated with the DRB is then sent to the CU-UP.

According to certain embodiments, a CU-CP of a network node for allocating TEIDs includes memory operable to store instructions and processing circuitry. The processing circuitry is operable to execute the instructions to cause the network node to receive, from a CU-UP, at least one UL TEID associated with a DRB. The at least one UL TEID is sent to a distributed unit (DU). At least one downlink TEID (DL TEID) associated with the DRB is received from the DU. The at least one DL TEID associated with the DRB is then sent to the CU-UP.

According to certain embodiments, a method by a network node for allocating TEIDs includes sending, by a CU-CP of the network node, a bearer setup request to a CU-UP of the network node. A bearer setup response is received from the CU-UP. The bearer set up response includes at least one UL TEID per bearer. A context setup request is sent to a DU. The context setup request includes the at least one UL TEID per bearer. A context setup response is received from the DU that includes at least one DL TEID per bearer. A bearer modification request is sent to the CU-UP that includes the at least one DL TEID per bearer as received from the DU. A bearer modification response is received from the CU-UP.

According to certain embodiments, a network node for allocating tunnel endpoint identifiers includes memory operable to store instructions and processing circuitry. The processing circuitry is operable to execute the instructions to cause the network node to send, by a CU-CP of the network node, a bearer setup request to a CU-UP of the network node. A bearer setup response is received from the CU-UP. The bearer set up response includes at least one UL TEID per bearer. A context setup request is sent to a DU. The context setup request includes the at least one UL TEID per bearer. A context setup response is received from the DU that includes at least one DL TEID per bearer. A bearer modification request is sent to the CU-UP that includes the at least one DL TEID per bearer as received from the DU. A bearer modification response is received from the CU-UP.

According to certain embodiments, a method for allocating TEIDs by a CU-UP of a network node includes transmitting, to a CU-CP, at least one UL TEID associated with a DRB for forwarding to a DU. At least one DL TEID is received from the CU-CP. The at least one DL TEID is determined to be associated with the DRB by the DU and forwarded to the CU-UP by the CU-CP.

According to certain embodiments, a CU-UP of a network node is provided for allocating TEIDs. The CU-UP of the network node includes memory operable to store instructions and processing circuitry. The processing circuitry is operable to execute the instructions to cause the CU-UP of the network node to transmit, to a CU-CP, at least one UL TEID associated with a DRB for forwarding to a DU. At least one DL TEID is received from the CU-CP. The at least one DL TEID is determined to be associated with the DRB by the DU and forwarded to the CU-UP by the CU-CP.

According to certain embodiments, a method for allocating TEIDs by a DU of a network node includes receiving, from a CU-CP, at least one UL TEID associated with a DRB. The at least one UL TEID is determined by a CU-UP and forwarded to the DU by the CU-CP. At least one DL TEID associated with the DRB is transmitted to the CU-CP for forwarding to the CU-UP.

According to certain embodiments, a DU of a network node is provided for allocating TEIDs. The DU of the network node includes memory operable to store instructions and processing circuitry. The processing circuitry is operable to execute the instructions to cause the DU of the network node to receive, from a CU-CP, at least one UL TEID associated with a DRB. The at least one UL TEID is determined by a CU-UP and forwarded to the DU by the CU-CP. The at least one DL TEID associated with the DRB is transmitted to the CU-CP for forwarding to the CU-UP.

According to certain embodiments, a communication system includes a host computer comprising a communication interface configured to receive user data originating from a transmission from a user equipment (UE) to a base station. The base station comprises a radio interface and processing circuitry. The base station's processing circuitry is configured to receive, from a CU-UP, at least one UL TEID associated with a DRB. The at least one UL TEID is sent to a DU. At least one DL TEID associated with the DRB is received from the DU. The at least one DL TEID is sent to the CU-UP.

Certain embodiments may provide one or more of the following technical advantages. As an example, certain embodiments may enable implementations of a CU-UP that can connect to multiple CU-CPs, by allowing the DU and CU-UP to exchange TEIDs for the creation of a connection over the F1-U interface and therefore the corresponding DRB. As another example, an advantage may be that certain embodiments ensure that UL TEIDs used at the same CU-UP are always unique.

Certain embodiments may include none, some, or all of these advantages. Certain embodiments may include other advantages, as would be understood by a person having ordinary skill in the art.

BRIEF DESCRIPTION OF THE DESCRIPTION OF THE DRAWINGS

For a more complete understanding of the disclosed embodiments and their features and advantages, reference is now made to the following description, taken in conjunction with the accompanying drawings, in which.

Figure 16:
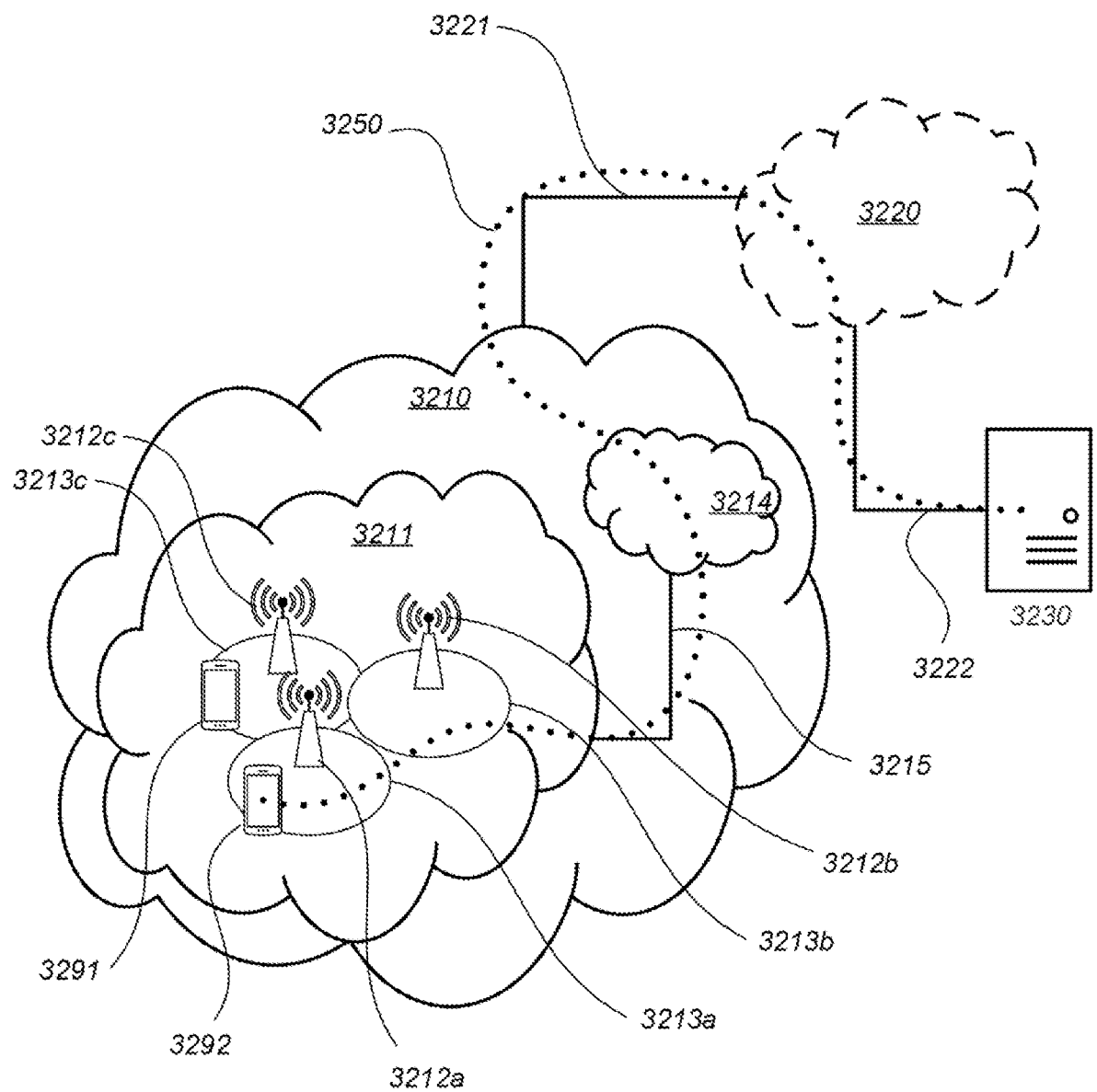
Figure 17:
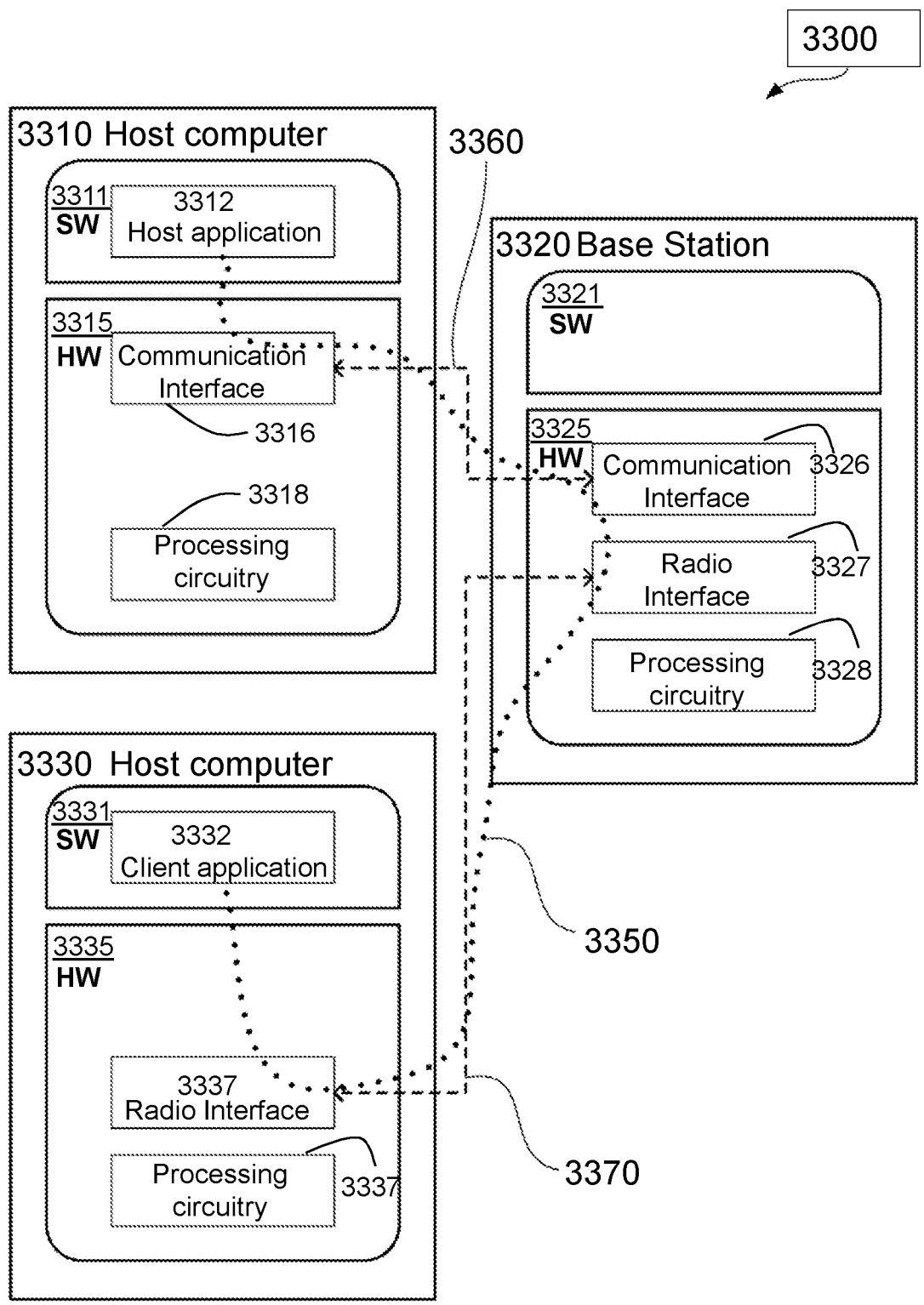

FIG. 16 schematically illustrates a telecommunication network connected via an intermediate network to a host computer, according to certain embodiments;

FIG. 17 is a generalized block diagram of a host computer communicating via a base station with a user equipment over a partially wireless connection, according to certain embodiments;

FIG. 18 illustrates a method implemented in a communication system including a host computer, a base station and a user equipment, according to certain embodiments;

FIG. 19 illustrates another method implemented in a communication system including a host computer, a base station and a user equipment, according to certain embodiments;

FIG. 20 illustrates another method implemented in a communication system including a host computer, a base station and a user equipment, according to certain embodiments; and FIG. 21 illustrates another method implemented in a communication system including a host computer, a base station and a user equipment, according to certain embodiments.

DETAILED DESCRIPTION

Particular embodiments are described in FIGS. 3-17 of the drawings, like numerals being used for like and corresponding parts of the various drawings.

Certain embodiments may include functionality for allocating tunnel endpoint identifiers (TEIDs). According to certain embodiments, for example, mechanisms are provided for exchanging TEIDs/uplink TEIDs (UL TEIDs) between a Distributed Unit (DU) and a Central Unit-User Plane (CU-UP) to establish a connection over the F1-U interface (and therefore the corresponding data radio bearers (DRB).

According to certain embodiments, the following mechanisms, which are feasible and introduce different advantages and drawbacks, are described as follows:

Mechanism 1a: CU-UP allocates UL TEIDs sequentially. This approach has two variants:

1. TEIDs are exchanged sequentially (Allocation of UL TEIDS first).
   (1) The CU-CP retrieves the UL TEIDs (one UL TEID per DRB that needs to be setup at the DU) from the CU-UP using the E1 interface and e.g., the E1AP bearer setup procedure. The bearer setup procedure between CU-CP and CU-UP may send to the CU-UP one or more temporary DL TEID per DRB. The CU-UP will therefore be able to establish an F1-U bearer with the DU, but it will only be able to receive UL traffic because only the UL TEIDs are definitive. This at least ensures the UE can UL traffic as soon as the DU receives the UL TEIDs. (2) The CU-CP sends one UL TEID per DRB to the DU and retrieves one DL TEID per DRB from the DU using the F1-C interface and e.g., the F1AP UE context setup procedure. (3) Finally, the CU-CP sends one DL TEID per DRB to the CU-UP using the E1 interface and e.g., the E1AP bearer modification procedure. From this moment on the CU-UP can also send DL traffic to the DU 2. TEIDs are exchanged sequentially (Allocation of DL TEIDS first).
   (1) The CU-CP sends one default (i.e. a temporary TEID that will be replaces with a definitive TEID) UL TEID per DRB to the DU and retrieves one DL TEID per DRB from the DU using the F1-C interface and e.g., the F1AP UE context setup procedure. (2) The CU-CP sends to the CU-UP the DL TEID per DRB allocated by the DU and retrieves from the CU-UP the UL TEIDs (one UL TEID per DRB that needs to be setup at the DU) using the E1 interface and e.g., the E1AP bearer setup procedure. The DU will therefore be able to establish an F1-U bearer with the CU-UP, but it will only be able to send DL traffic because only the DL TEIDs are definitive. This at least ensures the UE can receive DL traffic as soon as the CU-UP receives the DL TEIDs. (2) The CU-CP sends one UL TEID per DRB to the DU using the F1-C interface and e.g., the F1AP UE context setup procedure. (3)

Mechanism 1b: CU-UP allocates UL TEIDs in parallel.
(1a) The CU-CP retrieves the UL TEIDs (one UL TEID per DRB that needs to be setup at the DU) from the CU-UP using the E1 interface and e.g., the E1AP bearer setup procedure. (1b) At the same time, the CU-CP retrieves one DL TEID per DRB to be established from the DU using the F1-C interface and e.g., the F1AP UE context setup procedure. It needs to be noted that the F1AP Context Setup Request from CU to DU includes mandatory presence of one UL TEID per DRB to be established. The mandatory TEID fields could be filled with default values that are interpreted by the DU as not applicable. (2a) After 1a is completed, the CU-CP sends one UL TEID per DRB to the DU over the F1-C interface and using e.g., the F1AP UE context modification procedure. These UL TEIDs would replace the default values received via the UE Context Setup Request. After this step the DU can start sending UL traffic to the CU-UP (2b) After 1b is completed, CU-CP sends the DL TEID to the CU-UP over the E1 interface and using e.g., the E1AP bearer modification procedure. After this step the CU-UP can start sending DL traffic to the DU Mechanism 2a: CU-CP allocates UL TEIDs semi-statically.

During the E1 setup, the CU-UP sends to the CU-CP a range of UL TEIDs that are univocally reserved for this CU-CP, i.e. these TEIDS can be used for all DRBs the CU-CP intends to establish with its connected DUs. To setup a F1-U connection the following steps are executed. (1) The CU-CP selects one UL TEID per DRB out of the received UL TEID range and sends it to the DU and retrieves one DL TEID per DRB from the DU over the F1-C interface and using e.g., the F1AP UE context setup procedure. (1a) optionally the CU-CP may send in parallel to (1) an indication to the CU-UP that one or more bearers with a specific UL TEID each are being established at the DU. After this step the DU can immediately start sending UL traffic to the CU-UP, after sending the DL TEIDs to the CU-CP. (2) The CU-CP sends one UL TEID and DL TEID per DRB to the CU-UP over the E1 interface and using e.g., the bearer setup procedure.

In case that the CU-CP is close to run out of UL TEIDs, i.e. the allocated range of UL TEID is nearly fully used: (1) it can request more TEIDs to the CU-UP via the E1 interface using e.g., CU-CP configuration update procedure. (2) the CU-UP may realize that a CU-UP is running out of UL TEIDs and can send it autonomously to the CU-UP over the E1 interface using e.g., the CU-UP configuration update procedure. (3) The CU-CP can allocate a UL TEID outside its range with the hope that this will not create conflict (i.e., hoping that this UL TEID is not already in use by another CU-CP). If the allocated TEID is in use already, the CU-UP will reply with a different TEID (and possibly an extended range of TEIDs that the CU-CP is allowed to use).

Mechanism 2b: CU-CP allocates UL TEIDs with trail and fail approach.

In this approach, the CU-CP allocates the UL TEID similarly as in approach 2a, but it is not given any range in advance. If the CU-CP allocates an UL TEID that is already in-use by another CU-CP this would cause a conflict. The CU-UP will solve the conflict by allocating a new UL TEID and signal it to CU-CP. The CU-CP sends the new UL TEID to the DU over the F1-C using e.g., F1AP UE context modification procedure.

FIGS. 3-9 illustrate in greater details the mechanisms 1a-2a and 1b-2b described above. Among the various approaches described herein, the most promising of the approaches in terms of performance are the CU-UP allocation where the TEIDs are exchanged in parallel and the CU-CP allocation of semi-static TEIDs. However, the other approaches are also possible.

Figure 1:
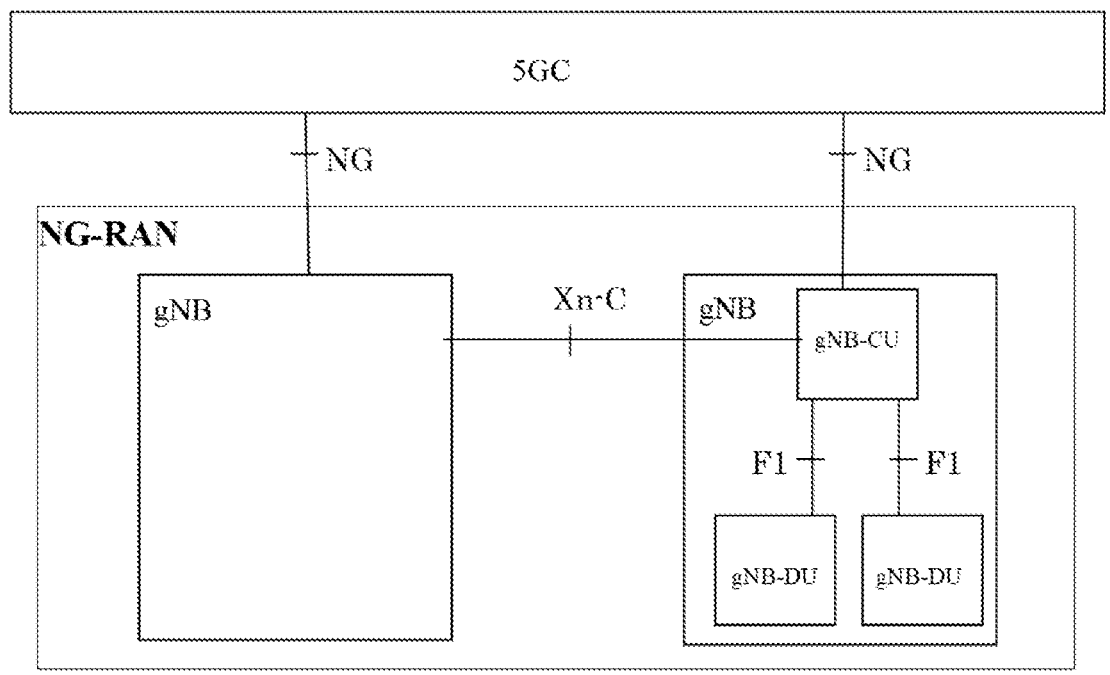
FIG. 1 illustrates the current 5th generation (NG) Radio Access Network (RAN) architecture as described in 3GPP TS 38.401.
Figure 2:
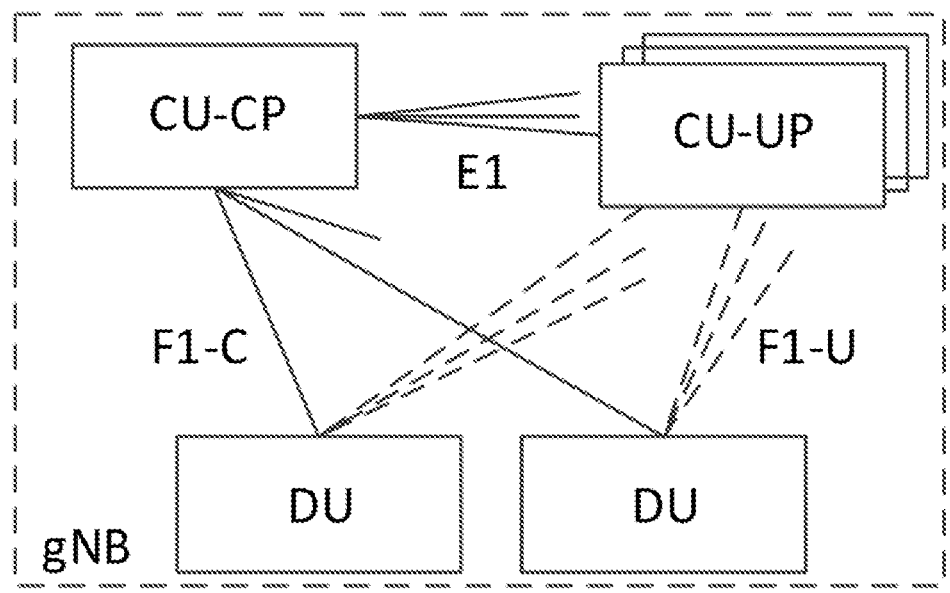
FIG. 2 illustrates an example architecture that separates the CU into a CU-CP and CU-UP as it is being studied in 3GPP TR 38.806.
Figure 3:
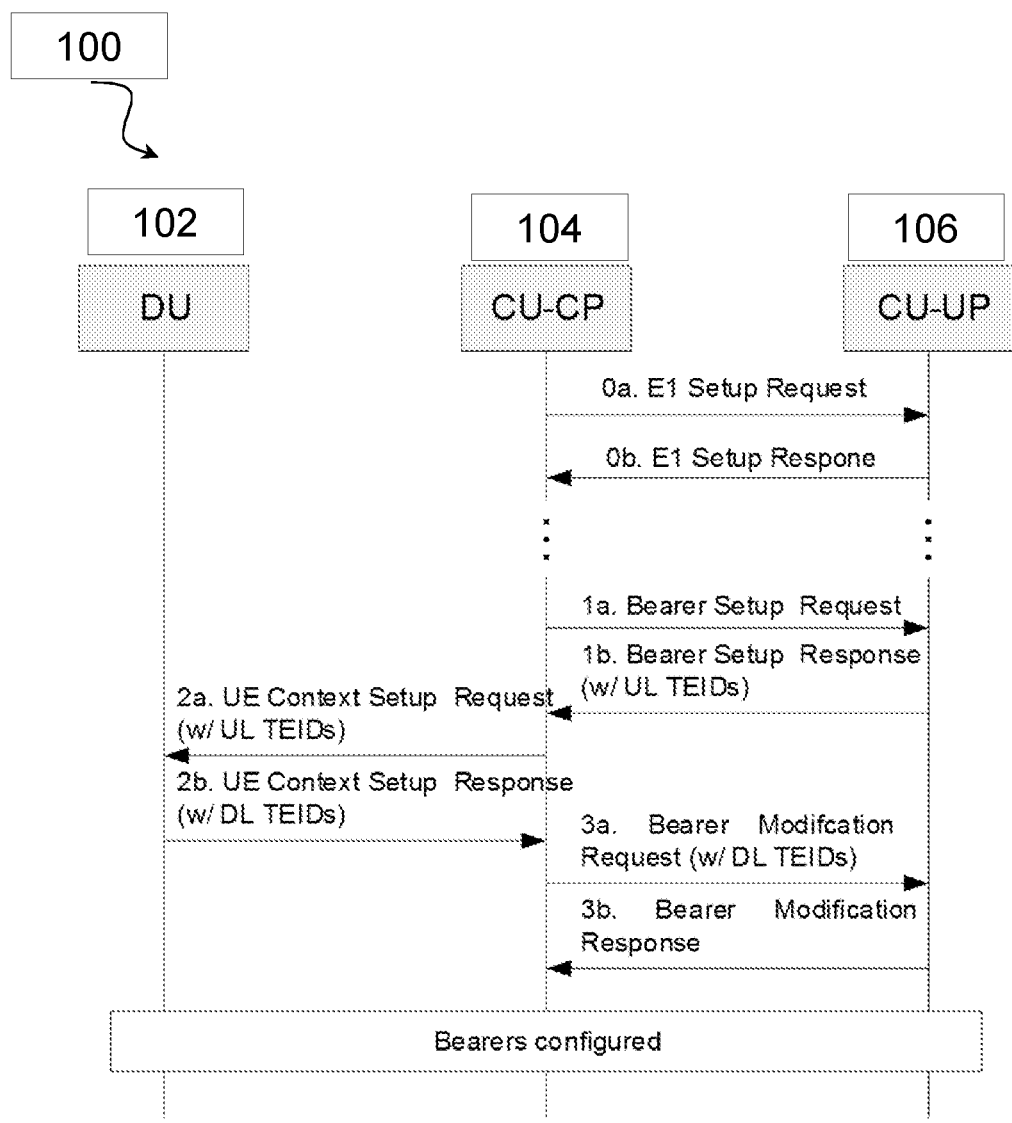
FIG. 3 illustrates a signaling diagram depicting sequential allocation of tunnel endpoints identifiers (TEIDs) and/or uplink TEIDS (UL TEIDS) by CU-UP, according to certain embodiments.

Specifically, FIG. 3 illustrates a signaling diagram 300 depicting sequential allocation of TEIDs by a CU-UP, according to certain embodiments.

At 0a-0b, the E1 interface between a CU-CP 304 and CU-UP 306 is established. As shown, an E1 set up request is sent from CU-CP 304 to CU-UP 306 at 0a. CU-UP 306 responds with an E1 set up response at 0b.

At 1a, the CU-CP 304 sends E1AP bearer setup request to CU-UP 306. If successful, CU-UP 306 replies at 1b, with E1AP bearer setup response that includes the selected UL TEID per bearer/DRB.

At 2a, the CU-CP 304 sends F1AP UE context setup request to DU 302 that includes one UL TEID per DRB. If successful, the DU 302 replies at 2b with F1AP UE context setup response that includes the selected DL TEID per DRB.

At 3a, the CU-CP 304 sends E1AP bearer modification request to CU-UP 306 that includes one DL TEID per DRB as communicated by the DU 302. The CU-UP 306 replies at 3b with a bearer modification response. The DRB is established over the F1.

The example signaling may also be used to establish multiple bearers at the same time. Thus, the messages can include multiple UL/DL TEIDs. This is valid for all the mechanisms and methods described herein.

Figure 4:
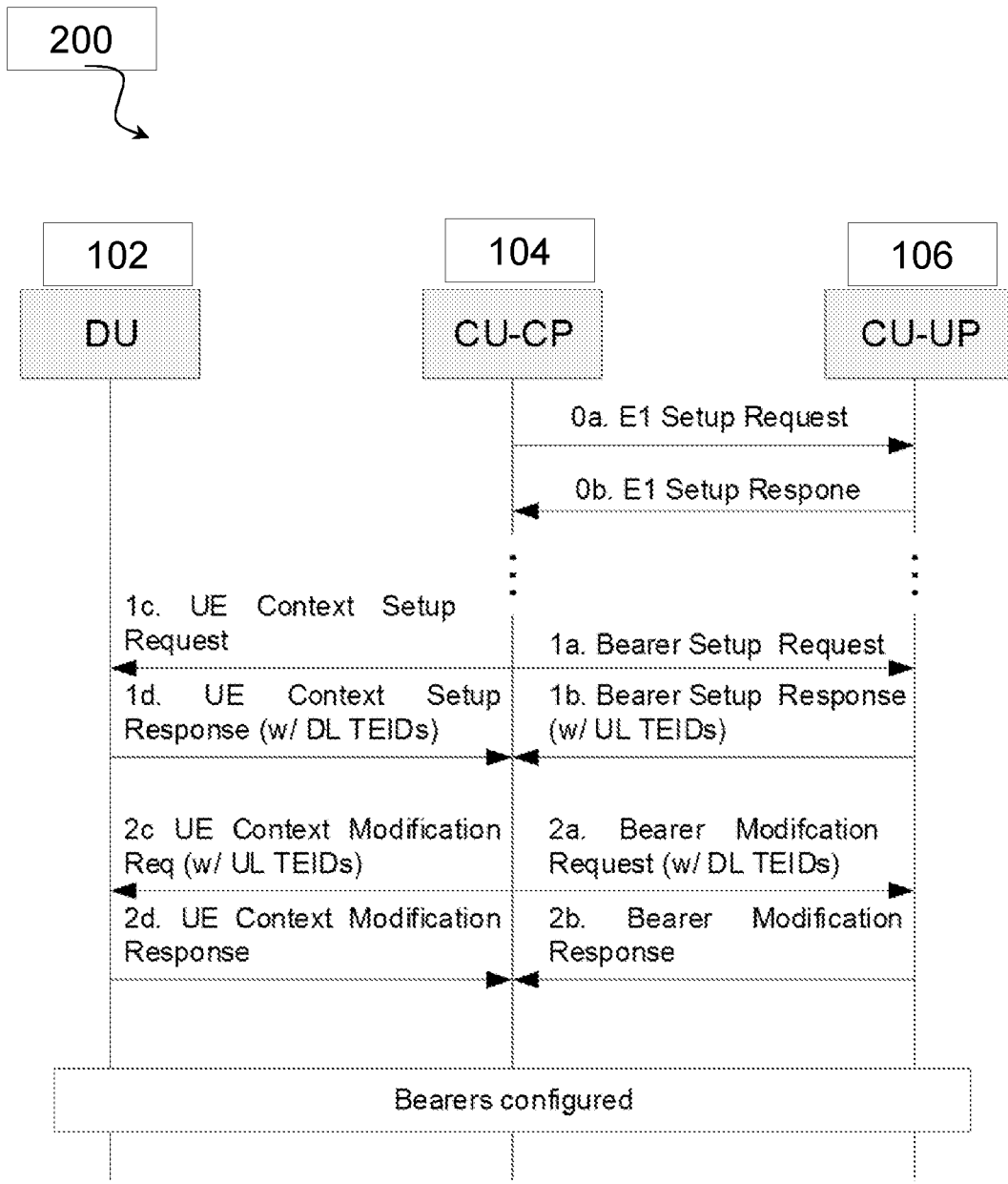
FIG. 4 illustrates a signaling diagram depicting parallel allocation of TEIDs and/or UL TEIDS by CU-UP, according to certain embodiments.

FIG. 4 illustrates a signaling diagram 400 depicting parallel allocation of TEIDs and/or UL TEIDS by CU-UP, according to certain embodiments.

At 0a-0b, The E1 interface between a CU-CP and CU-UP is established. As shown, for example, an E1 set up request is sent from CU-CP 404 to CU-UP 406 at 0a. CU-UP 406 responds with an E1 set up response at 0b.

At 1a, the CU-CP 404 sends E1AP bearer setup request to CU-UP 406. If successful, CU-UP 406 replies at 1b with E1AP bearer setup response that includes the selected UL TEID per DRB. At 1c, the CU-CP 404 sends F1AP UE context setup request to DU 402. If successful, the DU 402 replies at 1d with F1AP UE context setup response that includes the selected DL TEID per DRB.

At 2a, the CU-CP 404 sends E1AP bearer modification request to CU-UP 406 that includes the DL TEID per DRB. The CU-UP 406 replies at 2b with bearer modification response. At 2c, the CU-CP 404 sends F1AP UE context modification request to DU 402 that includes the UL TEID per DRB. The DU 402 replies at 2d with F1AP UE context modification response. The DRB is established over the F1.

According to a particular embodiment, a variation may include the CU-CP 404 sending the UL TEID to the DU 402 using a DL RRC Message Transfer that also contains the RRC Reconfiguration message for the UE. This allows to save one round-trip between DU 402 and CU-CP 404.

According to another particular embodiment, a variation may include the CU-CP 404 sending the UL TEID to DU 402 using a new call 1 or class 2 procedure. Additionally or alternatively, the CU-CP 404 may send the DL TEID to CU-UP 406 using a new call 1 or class 2 procedure.

Figure 5:
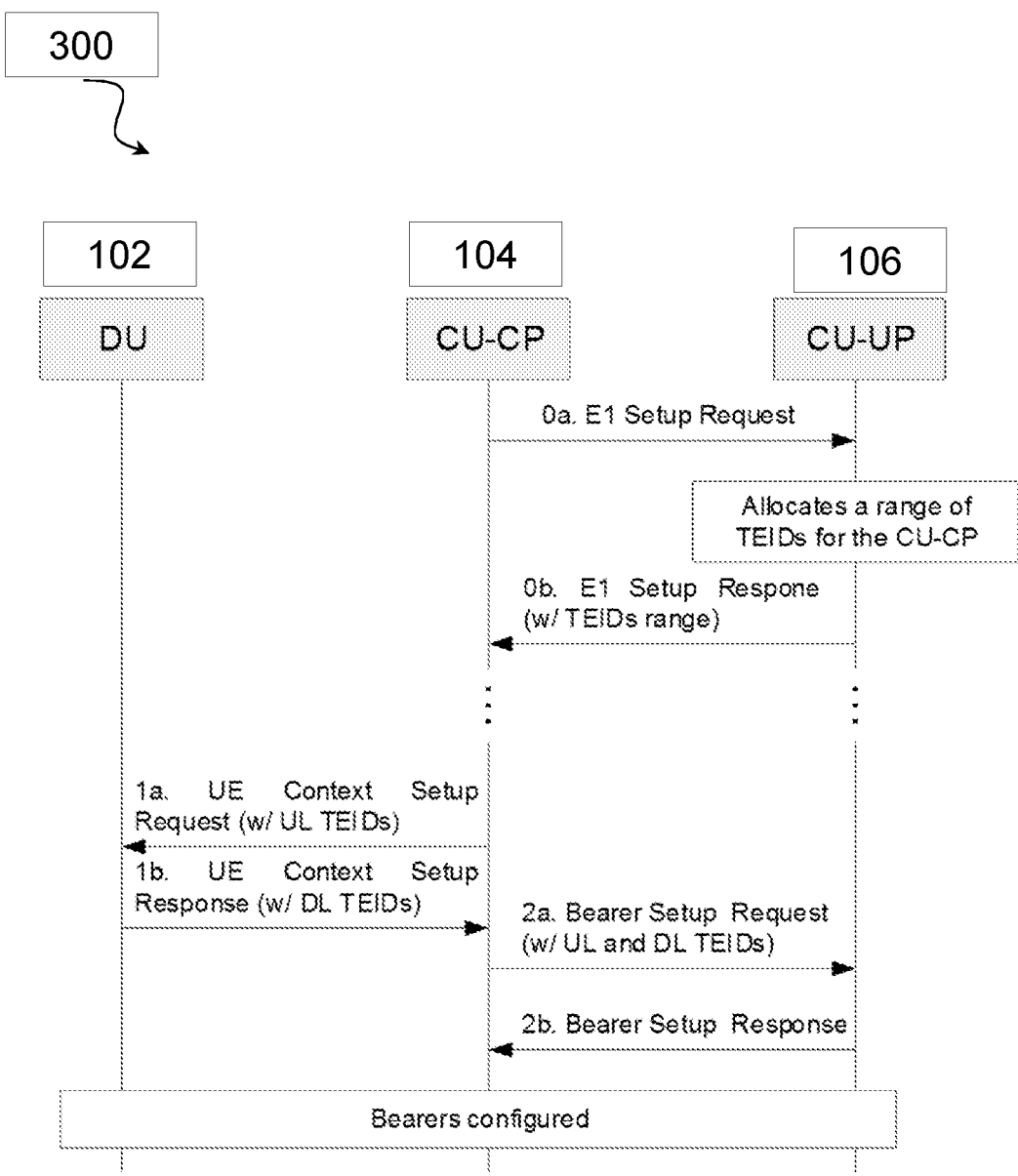
FIG. 5 illustrates a signaling diagram depicting semi-static allocation of TEIDs and/or UL TEIDS by CU-CP, according to certain embodiments.

FIG. 5 illustrates a signaling diagram 500 depicting semi-static allocation of TEIDs and/or UL TEIDS by CU-CP, according to certain embodiments.

At 0a-0b, the E1 interface between a CU-CP and CU-UP is established. As shown, for example, an E1 set up request is sent from CU-CP 504 to CU-UP 506 at 0a. CU-UP 506 responds with an E1 set up response at 0b. In the E1 setup response, the CU-UP 506 sends a range of UL TEIDs that are exclusively reserved for bearers established by this CU-CP 504.

At 1a-1b, the CU-CP 504 allocates one UL TEID per DRB. Specifically, at 1a, the CU-CP 504 sends a F1AP UE context setup request to DU 502 that includes the UL TEID per DRB. If successful, the DU 502 replies at 1b with a F1AP UE context setup response that includes the selected DL TEID per DRB.

At 2a, the CU-CP 504 sends an E1AP bearer setup request to CU-UP 506 that includes the DL and UL TEIDs for each established DRB. The CU-UP 506 replies at 2b with a bearer modification response. The DRB is established over the F1.

Thereafter, the range of TEIDs may be updated using configuration update over the E1 interface.

The range of TEIDs can be updated using configuration update over the e1.

As described above, a CU-UP may allocate UL TEIDs using a trial and error approach, according to certain other embodiments. This approach is described above as mechanism 2b and is similar to the approach referred to as Mechanism 2a, but without pre-reservation of UL TEIDs. Specifically, according to certain embodiments, the CU-CP may select a TEID that is already in use by another CU-CP. The CU-UP may solve the conflict by assigning a new UL TEID and sending it to the CU-CP over the E1 interface. The CU-CP may then send the new UL TEID to the DU using, for example, a UE context modification procedure or a DL RRC message transfer that also contains the RRC configuration message for the UE.

Figure 6:
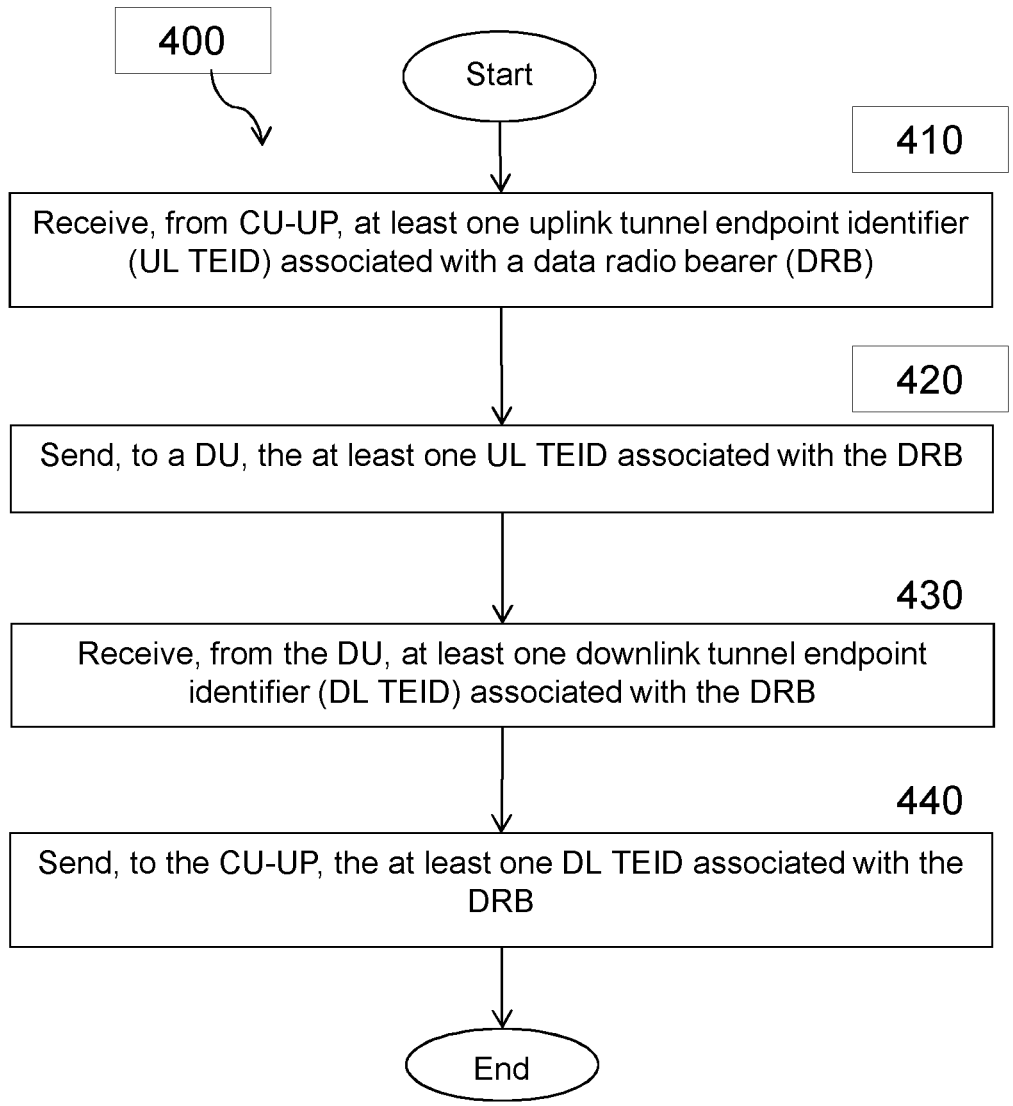
FIG. 6 illustrates an example method for allocating TEIDs by a CU-CP of a network node, according to certain embodiments.

FIG. 6 illustrates an example method 400 for allocating TEIDs by a CU-CP of a network node, according to certain embodiments. The method begins at step 410 when the CU-CP receives, from the CU-UP, at least one UL TEID associated with a DRB.

At step 420, the CU-CP sends, to a DU, the at least one UL TEID associated with the DRB.

At step 430, the CU-CP receives, from the DU, at least one DL TEID associated with the DRB.

At step 440, the CU-CP sends, to the CU-UP, the at least one DL TEID associated with the DRB.

In a particular embodiment, the at least one UL TEID and the at least one DL TEID are exchanged sequentially with the at least one UL TEID being received from the CU-UP and sent to the DU before the at least one DL TEID is received from the DU and sent to the CU-UP. In a further particular embodiment, the CU-CP may send a bearer setup request to the CU-UP, and the at least one UL TEID associated with the DRB may be received from the CU-UP in a bearer set up response.

In another particular embodiment, the at least one UL TEID associated with the DRB may be sent to the DU in a context setup request, and the at least one DL TEID associated with the DRB may be received in a context setup response from the DU.

In a particular embodiment, the at least one DL TEID associated with the DRB as received from the DU may be sent to the CU-UP as a bearer modification request. Additionally, CU-CP may receive a bearer modification response from the CU-UP.

In another particular embodiment, the at least one UL TEID and the at least one DL TEID may be exchanged sequentially, and the at least one DL TEID may be received from the DU and sent to the CU-UP before the at least one UL TEID is received from the CU-UP and sent to the DU. In a further particular embodiment, prior to receiving the at least one UL TEID associated with the DRB from the CU-UP, the CU-UP may send, to the DU, a temporary UL TEID associated with the DRB in a context setup request. The at least one DL TEID associated with the DRB may then be received from the DU as a context setup response. The at least one DL TEID associated with the DRB may be sent to the CU-UP in a bearer setup request, and the at least one UL TEID associated with the DRB may be received from the CU-UP in a bearer setup response.

In another particular embodiment, the at least one UL TEID associated with the DRB and the at least one DL TEID associated with the DRB may be exchanged in parallel. For example, the CU-CP may send a bearer setup request to the CU-UP. The CU-CP may also send a UE context setup request to the DU. The at least one UL TEID associated with the DRB may then be received from the CU-UP in a bearer setup response, and the at least one DL TEID associated with the DRB may be received from the DU in a context setup response. The at least one DL TEID associated with the DRB may be sent to the CU-UP in a bearer modification request, and the at least one UL TEID associated with the DRB may be sent to the DU in a UE context modification request.

In a particular embodiment, the at least one UL TEID includes a plurality of UL TEIDs, and each of the plurality of UL TEIDs are associated with a respective one of a plurality of DRBs. Likewise, the at least one of DL TEID may include a plurality of DL TEIDs, and each of the plurality of DL TEIDs may be associated with a respective one of the plurality of DRBs.

Figure 7:
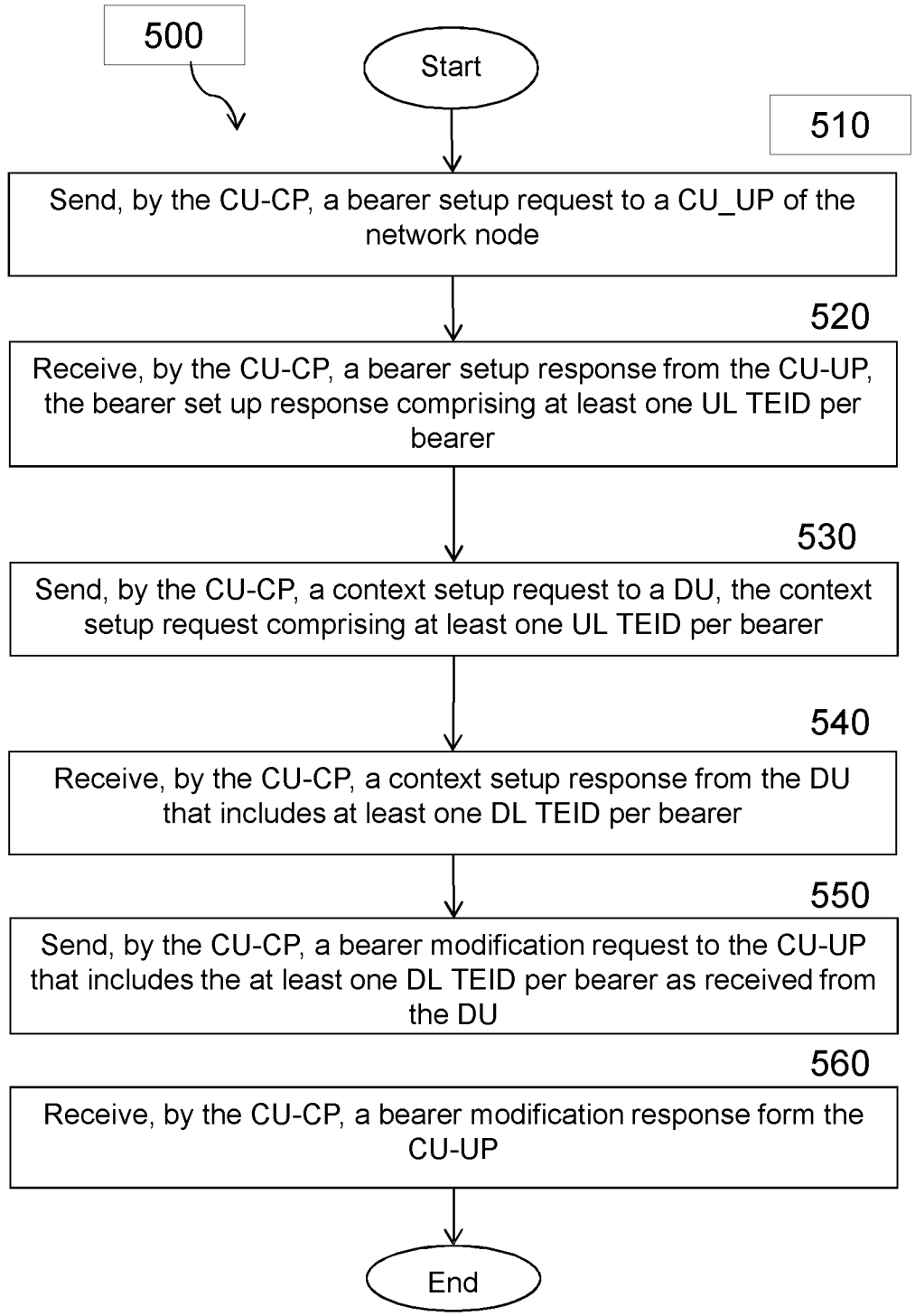
FIG. 7 illustrates another example method for allocating TEIDs by a CU-CP of a network node, according to certain embodiments.

FIG. 7 illustrates another example method 500 for allocating TEIDs by a CU-CP of a network node, according to certain embodiments. The method begins at step 510 with the CU-CP sending a bearer setup request to a CU-UP of the network node. At step 520, the CU-CP receives a bearer setup response from the CU-UP. The bearer set up response includes at least one UL TEID per bearer. At step 530, the CU-CP sends a context setup request to a DU. The context setup request includes the at least one UL TEID per bearer. At step 540, the CU-CP receives a context setup response from the DU that includes at least one DL TEID per bearer.

At step 550, the CU-CP sends a bearer modification request to the CU-UP that includes the at least one DL TEID per bearer as received from the DU. At step 560, the CU-CP receives a bearer modification response from the CU-UP.

Figure 8:
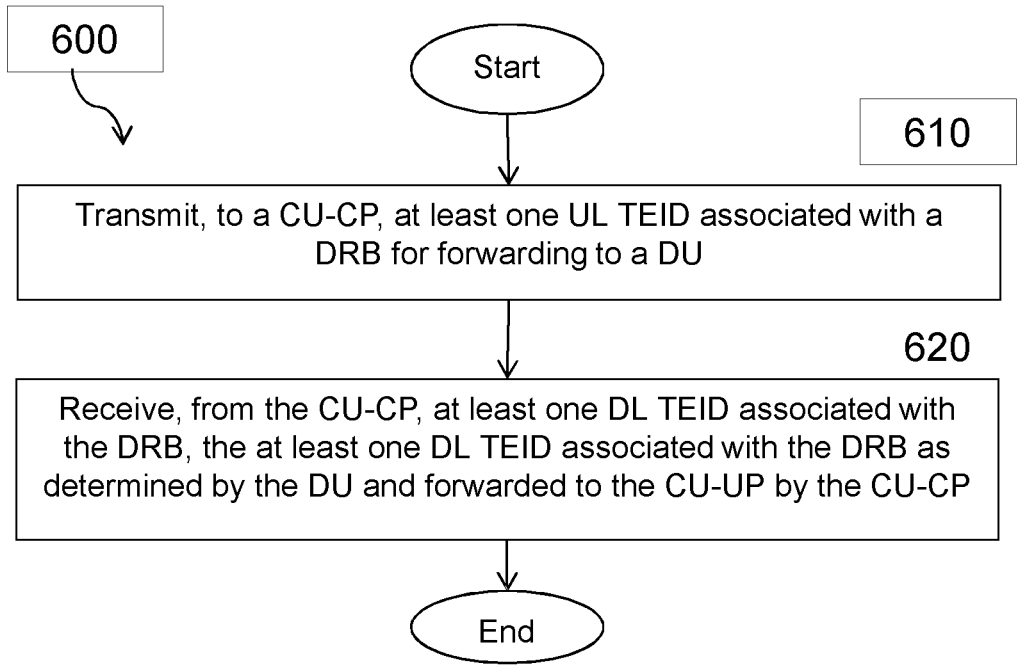
FIG. 8 illustrates an example method for allocating TEIDs by a CU-UP of a network node, according to certain embodiments.

FIG. 8 illustrates an example method 600 for allocating TEIDs by a CU-UP of a network node, according to certain embodiments. The method begins at step 610 when the CU-UP transmits, to a CU-CP, at least one UL TEID associated with a DRB for forwarding to a DU.

At step 620, the CU-UP receives, from the CU-CP, at least one DL TEID associated with the DRB. The at least one DL TEID is determined by the DU and forwarded to the CU-UP by the CU-CP.

In a particular embodiment, the method may further include receiving, by the CU-UP, a bearer setup request from the CU-CP. The at least one UL TEID associated with the DRB may be received in a bearer set up response.

In a particular embodiment, the at least one DL TEID associated with the DRB may be received from the CU-CP as a bearer modification request, and the method may further include the CU-UP transmitting a bearer modification response to the CU-CP.

In a particular embodiment, the at least one UL TEID may include a plurality of UL TEIDs, and each of the plurality of UL TEIDs may be associated with a respective one of a plurality of DRBs. Likewise, the at least one of DL TEID may include a plurality of DL TEIDs, and each of the plurality of DL TEIDs may be associated with a respective one of the plurality of DRBs.

Figure 9:
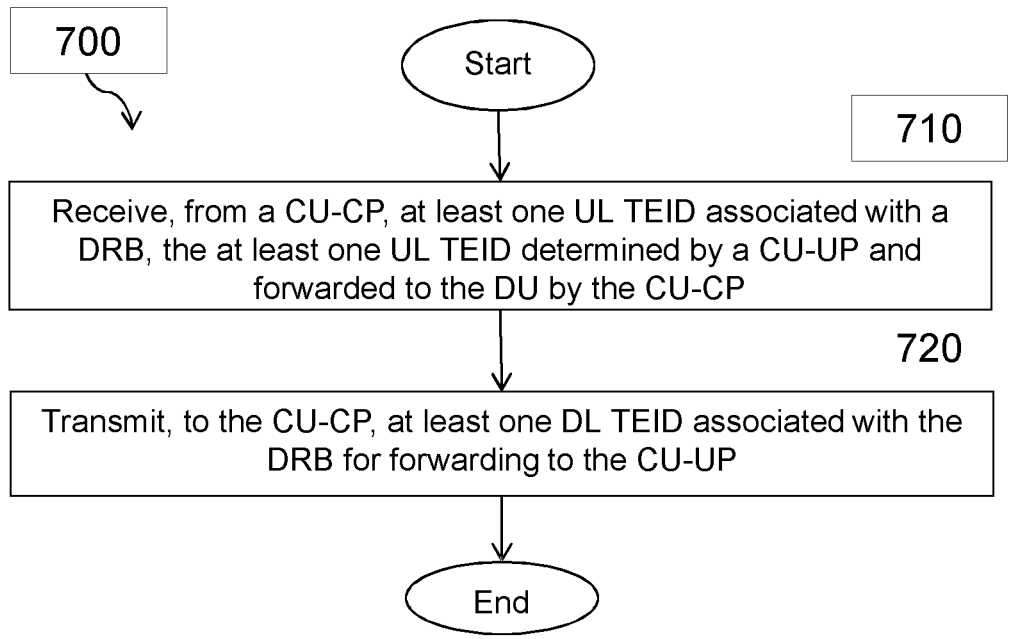
FIG. 9 illustrates an example method for allocating TEIDs by a DU of a network node, according to certain embodiments.

FIG. 9 illustrates an example method 700 for allocating TEIDs by a DU of a network node, according to certain embodiments. The method begins at step 710 when the DU receives, from a CU-CP, at least one UL TEID associated with a DRB. The at least one UL TEID is determined by a CU-UP and forwarded to the DU by the CU-CP.

At step 720, the DU transmits, to the CU-CP, at least one downlink TEID (DL TEID) associated with the DRB for forwarding to the CU-UP.

In a particular embodiment, the at least one UL TEID and the at least one DL TEID are exchanged sequentially with the at least one UL TEID being received by the DU before the at least one DL TEID is transmitted to the CU-CP.

In a particular embodiment, the at least one UL TEID associated with the DRB is received by the DU in a context setup request, and the at least one DL TEID associated with the DRB is transmitted to the CU-CP in a context setup response.

In a particular embodiment, the at least one UL TEID and the at least one DL TEIDs are exchanged sequentially with the at least one DL TEID being transmitted to the CU-CP before the at least one UL TEID is received from the CU-CP.

In a particular embodiment, the at least one UL TEID and the at least one DL TEID are exchanged in parallel. For example, in a particular embodiment, the at least one DL TEID may be transmitted to the CU-CP in a context setup response, and the at least one UL TEID may be received from the CU-CP in a UE context modification request.

In a particular embodiment, the at least one UL TEID includes a plurality of UL TEIDs, and each of the plurality of UL TEIDs are associated with a respective one of a plurality of DRBs. Likewise, the at least one of DL TEID may include a plurality of DL TEIDs, and each of the plurality of DL TEIDs may be associated with a respective one of the plurality of DRBs.

Figure 10:
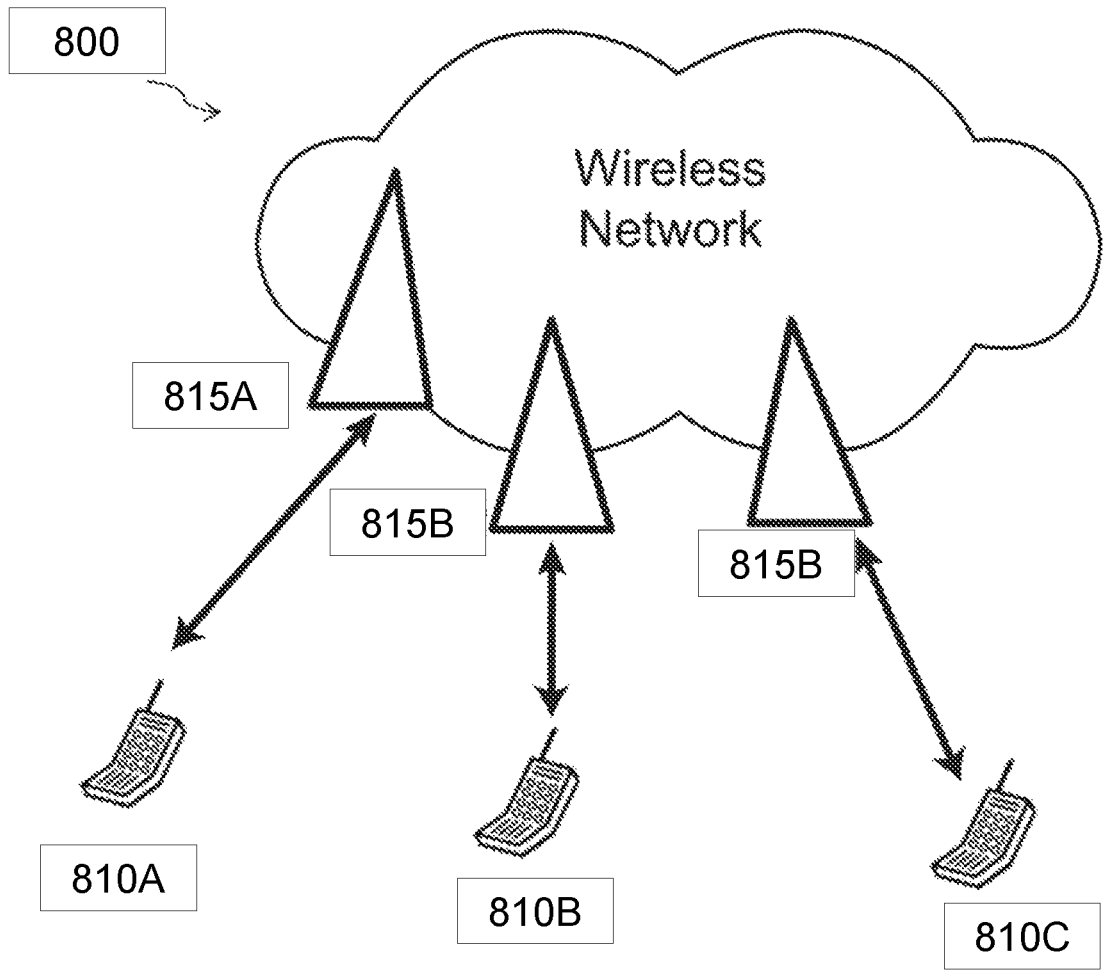
FIG. 10 illustrates an example wireless network for allocating TEIDS, according to certain embodiments.

FIG. 10 is a block diagram illustrating an embodiment of a network 800 for allocating tunnel endpoint identifiers (TEIDs), in accordance with certain embodiments. Network 800 includes one or more wireless devices 810A-C, which may be interchangeably referred to as wireless devices 810 or UEs 810, and network nodes 815A-C, which may be interchangeably referred to as network nodes 815 or eNodeBs 815. A wireless device 810 may communicate with network nodes 815 over a wireless interface. For example, wireless device 810A may transmit wireless signals to one or more of network nodes 815, and/or receive wireless signals from one or more of network nodes 815. The wireless signals may contain voice traffic, data traffic, control signals, and/or any other suitable information. In some embodiments, an area of wireless signal coverage associated with a network node 815 may be referred to as a cell. In some embodiments, wireless devices 810 may have D2D capability. Thus, wireless devices 810 may be able to receive signals from and/or transmit signals directly to another wireless device 810. For example, wireless device 810A may be able to receive signals from and/or transmit signals to wireless device 810B.

In certain embodiments, network nodes 815 may interface with a radio network controller (not depicted in FIG. 10). The radio network controller may control network nodes 815 and may provide certain radio resource management functions, mobility management functions, and/or other suitable functions. In certain embodiments, the functions of the radio network controller may be included in network node 815. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 810. Wireless devices 810 may exchange certain signals with the core network node using the non-access stratum layer. In non-access stratum signaling, signals between wireless devices 810 and the core network node may be transparently passed through the radio access network. In certain embodiments, network nodes 815 may interface with one or more network nodes over an internode interface. For example, network nodes 815A and 815B may interface over an X2 interface.

As described above, example embodiments of network 800 may include one or more wireless devices 810, and one or more different types of network nodes capable of communicating (directly or indirectly) with wireless devices 810. Wireless device 810 may refer to any type of wireless device communicating with a node and/or with another wireless device in a cellular or mobile communication system. Examples of wireless device 810 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 810 may also be referred to as UE, a station (STA), a device, or a terminal in some embodiments. Also, in some embodiments, generic terminology, "radio network node" (or simply "network node") is used. It can be any kind of network node, which may comprise a Node B, base station (BS), multi-standard radio (MSR) radio node such as MSR BS, eNode B, network controller, radio network controller (RNC), base station controller (BSC), relay donor node controlling relay, base transceiver station (BTS), access point (AP), transmission points, transmission nodes, remote RF unit (RRU), remote radio head (RRH), nodes in distributed antenna system (DAS), core network node (e.g. MSC, MME etc.), O&M, OSS, SON, positioning node (e.g. E-SMLC), MDT, or any suitable network node. Example embodiments of network nodes 815, wireless devices 810, and other network nodes (such as radio network controller or core network node) are described in more detail with respect to FIGS. 11, 14, and 151, respectively.

Although FIG. 10 illustrates a particular arrangement of network 800, the present disclosure contemplates that the various embodiments described herein may be applied to a variety of networks having any suitable configuration. For example, network 800 may include any suitable number of wireless devices 810 and network nodes 815, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques for allocating tunnel endpoint identifiers (TEIDs) described herein are applicable to both LAA LTE and standalone LTE operation in license-exempt channels. The described techniques are generally applicable for transmissions from both network nodes 815 and wireless devices 810.

Figure 11:
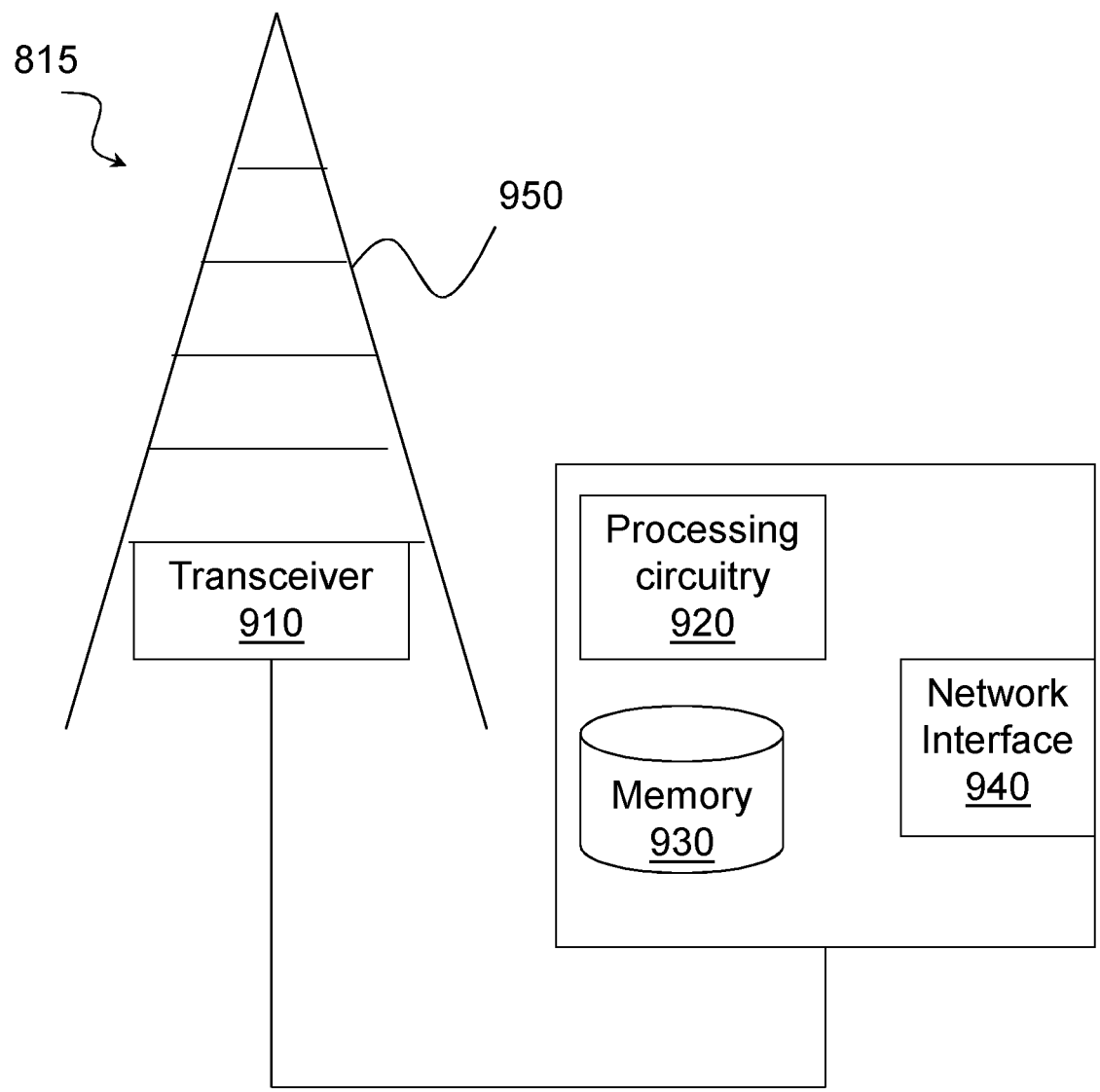
FIG. 11 illustrates an example embodiment of a network node for allocating TEIDS, according to certain embodiments.

FIG. 11 illustrates an example network node 815 for allocating tunnel endpoint identifiers (TEIDs), in accordance with certain embodiments. Network node 815 may be any type of radio network node or any network node that communicates with a UE and/or with another network node. Examples of network node 815 include an gNB, eNodeB, a node B, a base station, a wireless access point (e.g., a Wi-Fi access point), a low power node, a base transceiver station (BTS), relay, donor node controlling relay, transmission points, transmission nodes, RRU, RRH, multi-standard radio (MSR) radio node such as MSR BS, nodes in distributed antenna system (DAS), O&M, OSS, SON, positioning node (e.g., E-SMLC), MDT, or any other suitable network node. Network nodes 815 may be deployed throughout network 800 as a homogenous deployment, heterogeneous deployment, or mixed deployment. A homogeneous deployment may generally describe a deployment made up of the same (or similar) type of network nodes 815 and/or similar coverage and cell sizes and inter-site distances. A heterogeneous deployment may generally describe deployments using a variety of types of network nodes 815 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 815 may include one or more of transceiver 910, processing circuitry 920 (e.g., which may include one or more processors), memory 930, and network interface 940. In some embodiments, transceiver 910 facilitates transmitting wireless signals to and receiving wireless signals from wireless device 810 (e.g., via antenna 950), processing circuitry 920 executes instructions to provide some or all of the functionality described above as being provided by a network node 815, memory 930 stores the instructions executed by processing circuitry 920, and network interface 940 communicates signals to backend network components, such as a gateway, switch, router, Internet, Public Switched Telephone Network (PSTN), core network nodes or radio network controllers, etc.

Processing circuitry 920 may include any suitable combination of hardware and software implemented in one or more modules to execute instructions and manipulate data to perform some or all of the described functions of network node 815, such as those described in relation to any of sections 3, 4, or 6 herein. For example, in general, processing circuitry 920 may cause network node to send a paging message that includes a system information notification. In certain embodiments, the system information notification may be sent in response to detecting a change in the risk of an overload situation on access resources and may indicate that the wireless device 810 is to apply a previously stored version of system information. In some embodiments, processing circuitry 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processing circuitry 920 and may refer to any suitable device operable to receive input for network node 815, send output from network node 815, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of network node 815 may include additional components beyond those shown in FIG. 11 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 12:
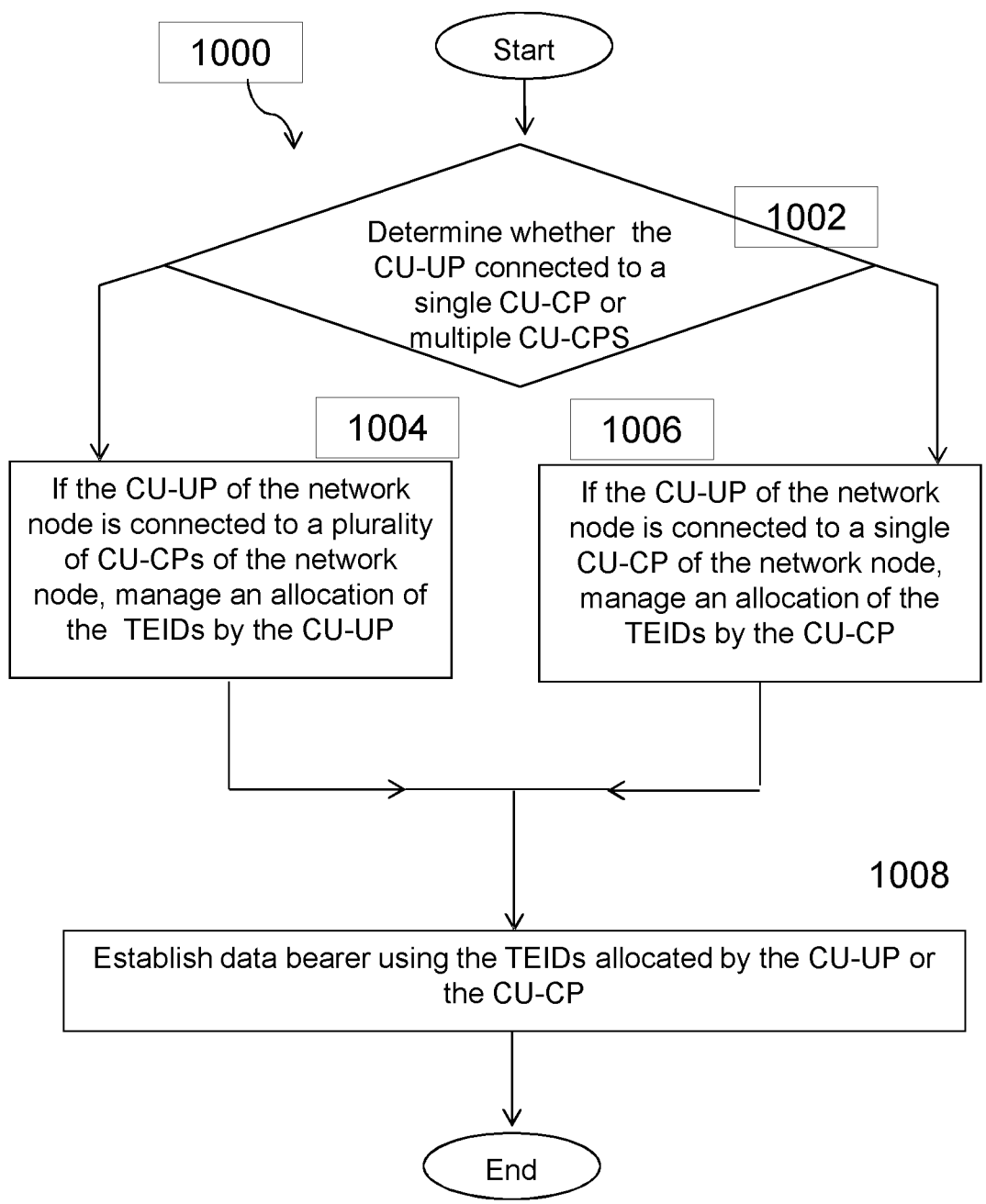
FIG. 12 illustrates another example method by a network node for allocating TEIDS, according to certain embodiments.

FIG. 12 illustrates an example method 1000 by a network node 815 for allocating tunnel endpoint identifiers (TEIDs), according to certain embodiments. The method begins at step 1002 when network node 815 determines whether a CU-UP of the network node is connected to a plurality of CU-CPs of the network node or a single CU-CP.

If the CU-UP is connected to the plurality of CU-CPs, allocation of the TEIDs is managed by the CU-UP at step 1004, In a particular embodiment, the CU-UP may sequentially exchange UL TEIDs and DL TEIDs and the UL TEIDs may be exchanged before the DL TEIDs. Specifically, sequentially exchanging the UL TEIDs and DL TEIDs may include:
  sending, by the CU-CP, a bearer setup request to a CU-UP;
  receiving, by the CU-CP, a bearer setup response from the CU-UP, the bearer set up response comprising an uplink TEID (UL TEID) per bearer;
  sending, by the CU-CP, a context setup request to a DU, the context setup request comprising the UL TEID per bearer;
  receiving, by the CU-CP, a context setup response from the DU that includes a downlink TEID (DL TEID) per bearer;
  sending, by the CU-CP, a bearer modification request to the CU-UP that includes the DL TEID per DRB as received from the DU; and
  receiving, by the CU-CP, a bearer modification response from the CU-UP.

Alternatively, the DL TEIDs may be exchanged before the UL TEIDs.

In another particular embodiment, the CU-UP may exchange UL TEIDs and DL TEIDs in parallel by:
  sending, by a CU-CP, a bearer setup request to a CU-UP;
  receiving, by the CU-CP, a bearer setup response that includes an UL TEID per bearer;
  sending, by the CU-CP, a UE context setup request to a DU;
  receiving, by the CU-CP, a UE context setup response from the DU, the UE context setup response comprising a DL TEID per bearer;
  sending, by the CU-CP, a bearer modification request to the CU-UP, the bearer modification request comprising the DL TEID per bearer received from the DU;
  receiving, by the CU-CP, a bearer modification response from the CU-UP;
  sending, by the CU-CP, a UE context modification request to the DU, the UE context modification request comprising the UL TEID per bearer; and
  receiving, by the CU-CP, a UE context modification response from the DU.

In a particular embodiment, the CU-CP may sends the UL TEID per bearer to the DU using a DL RRC message that also comprises an RRC Reconfiguration message for a UE. In another embodiment, the CU-CP may send the UL TEID per bearer to the DU using a new call 1 or class 2 procedure. The CU-CP may also send the DL TEID to the CU-UP using a new call 1 or class 2 procedure.

In other embodiments, if the CU-UP is connected to the single CU-CP, allocation of the TEIDs is managed by the CU-CP at step 806. According to a particular embodiment, the UL TEIDs may be allocated such that UL TEADs and DL TEIDs are exchanged semi-statically. For example, in a particular embodiment, the CU-CP may:
  send a setup request to the CU-UP;
  receive a setup response from the CU-UP, the setup response comprising a range of uplink TEIDs (UL TEIDs) that are reserved for bearers established by the CU-CP;
  allocate one UL TEID per bearer;
  sending a bearer setup request to the CU-UP, the bearer setup request comprising the DL and UL TEIDs for each established bearer; and
  receive a bearer modification response from the CU-UP.

In a particular embodiment, for example, allocating the one UL TEID per bearer may include sending, to the DU, a UE context setup request that includes the UL TEID per bearer and receiving, from the DU, a UE context setup response that includes a DL TEID per bearer.

According to certain other embodiments, the CU-UP may be connected to the plurality CU-CPs and the allocation of the TEIDS may be by a trial and error approach. Specifically, the CU-CP may select a TEID that is already in use by another CU-CP. The CU-UP may resolve the conflict by assigning a new UL TEID, which may be sent to the CU-CP. The CU-CP may then send the new UL TEID to the DU. In a particular embodiment, the new UL TEID is sent to the DU using a UE context modification procedure or a downlink radio resource control (DL RRC) message transfer that also contains an RRC configuration message for a UE.

At step 1008, a data bearer is established using the TEIDs allocated by the CU-UP or the CU-CP.

Figure 13:
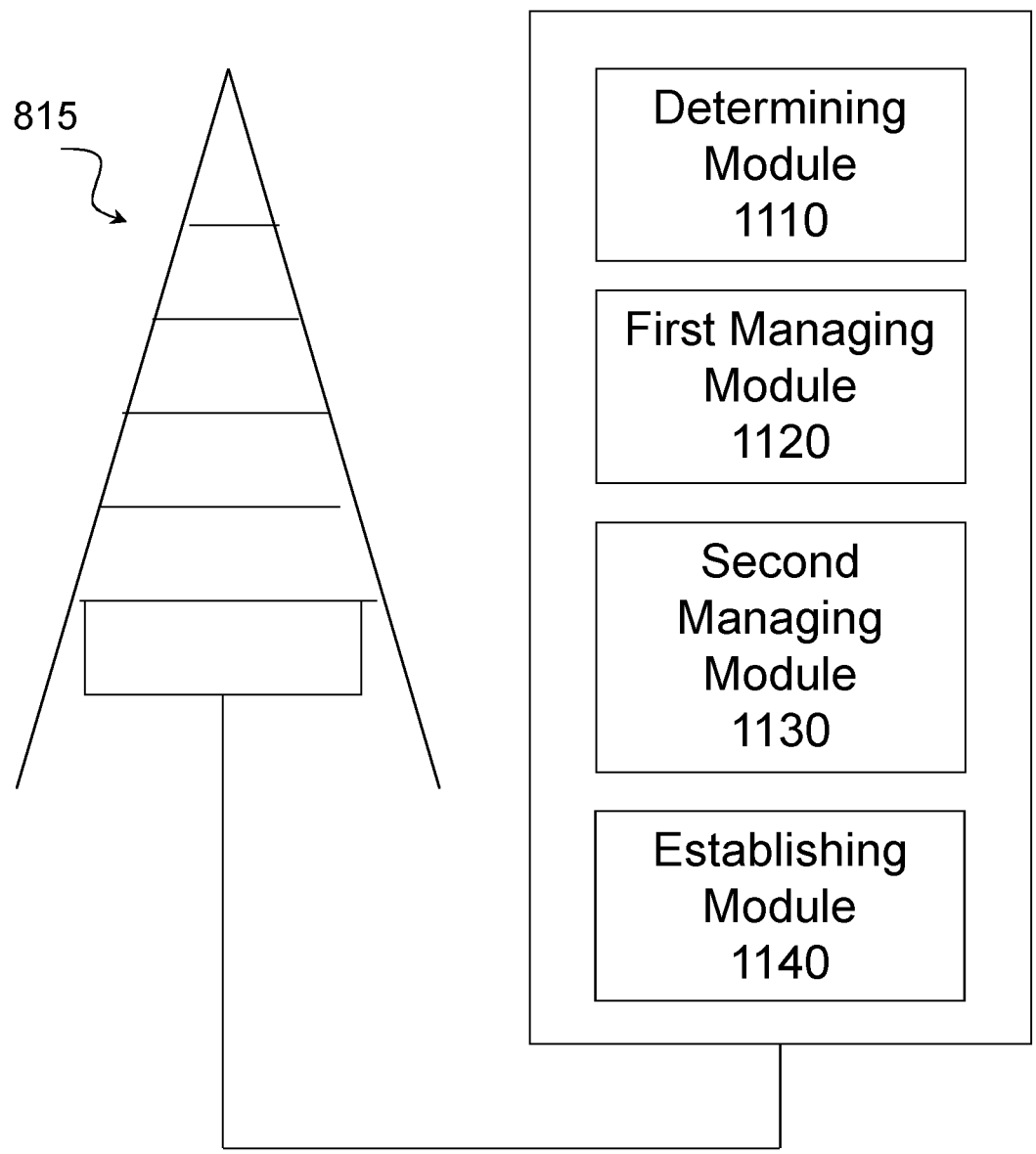
FIG. 13 illustrates another example virtual computing device for allocating TEIDS, according to certain embodiments.

In certain embodiments, the method for allocating tunnel endpoint identifiers (TEIDs) may be performed by a virtual computing device. FIG. 13 illustrates an example virtual computing device 1100 for allocating tunnel endpoint identifiers (TEIDs), according to certain embodiments. In certain embodiments, virtual computing device 1100 may include modules for performing steps similar to those described above with regard to the method illustrated and described in FIG. 12. For example, virtual computing device 1100 may include a determining module 1110, a first managing module 1120, a second managing module 1130, an establishing module 1140, and any other suitable modules for allocating tunnel endpoint identifiers (TEIDs). In some embodiments, one or more of the modules may be implemented using processing circuitry 920 of FIG. 11. In certain embodiments, the functions of two or more of the various modules may be combined into a single module.

The determining module 1110 may perform certain of the determining functions of virtual computing device 1100. For example, in a particular embodiment, determining module 1110 may determine whether a CU-UP of the network node is connected to a plurality of CU-CPs of the network node or a single CU-CP.

The first managing module 1120 may perform certain of the managing functions of virtual computing device 1100. For example, in a particular embodiment, if the CU-UP is connected to the plurality of CU-CPs, first managing module 1120 may manage allocation of the TEIDs by the CU-UP.

The second managing module 1130 may perform certain of the managing functions of virtual computing device 1100. For example, in a particular embodiment, if the CU-UP is connected to a single CU-CP, second managing module 1130 may manage allocation of the TEIDs by the CU-CP.

The establishing module 1140 may perform certain of the establishing functions of virtual computing device 1100. For example, in a particular embodiment, establishing module 1140 may establish a data bearer is established using the TEIDs allocated by the CU-UP or the CU-CP.

Other embodiments of virtual computing device 1100 may include additional components beyond those shown in FIG. 13 that may be responsible for providing certain aspects of the network node's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Figure 14:
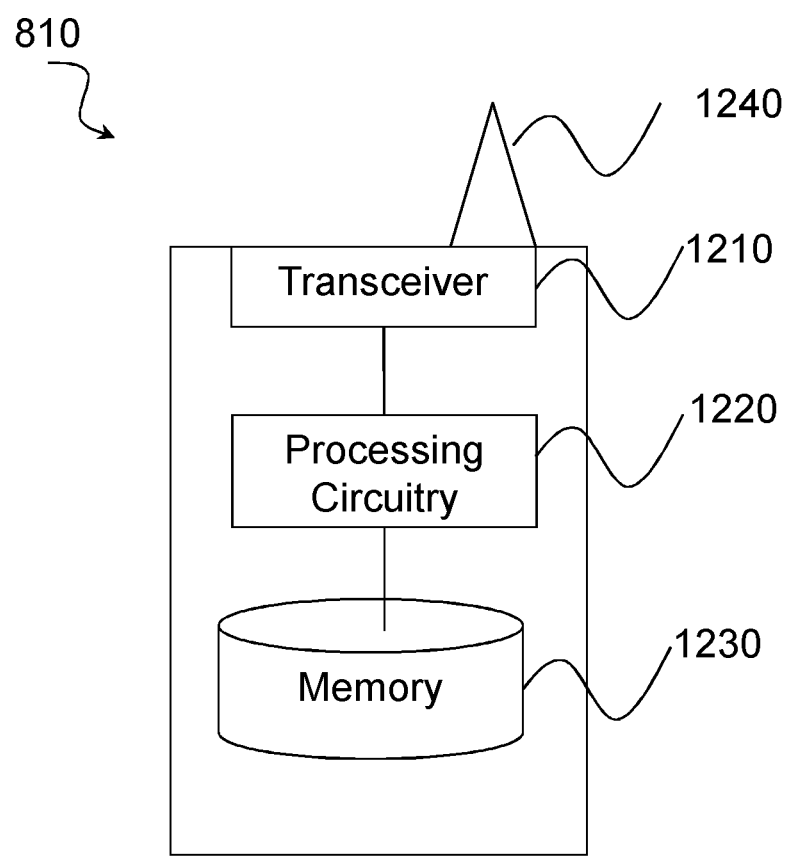
FIG. 14 illustrates an example embodiment of a wireless device, according to certain embodiments.

FIG. 14 is a block schematic of an exemplary wireless device 810 for allocating tunnel endpoint identifiers (TEIDs), in accordance with certain embodiments. Wireless device 810 may refer to any type of wireless device communicating with a node and/or with another wireless device in a cellular or mobile communication system. Examples of wireless device 810 include a mobile phone, a smart phone, a PDA (Personal Digital Assistant), a portable computer (e.g., laptop, tablet), a sensor, a modem, an MTC device/machine-to-machine (M2M) device, laptop embedded equipment (LEE), laptop mounted equipment (LME), USB dongles, a D2D capable device, or another device that can provide wireless communication. A wireless device 810 may also be referred to as UE, a station (STA), a device, or a terminal in some embodiments. Wireless device 810 includes transceiver 1210, processing circuitry 1220, and memory 1230. In some embodiments, transceiver 1210 facilitates transmitting wireless signals to and receiving wireless signals from network node 815 (e.g., via antenna 1240), processing circuitry 1220 (e.g., which may include one or more processors) executes instructions to provide some or all of the functionality described above as being provided by wireless device 810, and memory 1230 stores the instructions executed by processing circuitry 1220.

Processing circuitry 1220 may include any suitable combination of hardware and software implemented in one or more modules to execute instructions and manipulate data to perform some or all of the described functions of wireless device 810, such as the functions of UE 810 (i.e., wireless device 810) described in herein. For example, in general, processing circuitry may save a current version of system information and/or apply a previously stored version of system information based on a system information notification (e.g., system information change notification, system information modification, or system information update) received in a paging message from a network node 815. In some embodiments, processing circuitry 1220 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processor 1220.

Other embodiments of wireless device 810 may optionally include additional components beyond those shown in FIG. 14 that may be responsible for providing certain aspects of the wireless device's functionality, including any of the functionality described above and/or any additional functionality (including any functionality necessary to support the solution described above). As just one example, wireless device 810 may include input devices and circuits, output devices, and one or more synchronization units or circuits, which may be part of the processing circuitry 1220. Input devices include mechanisms for entry of data into wireless device 810. For example, input devices may include input mechanisms, such as a microphone, input elements, a display, etc. Output devices may include mechanisms for outputting data in audio, video, and/or hard copy format. For example, output devices may include a speaker, a display, etc.

Figure 15:
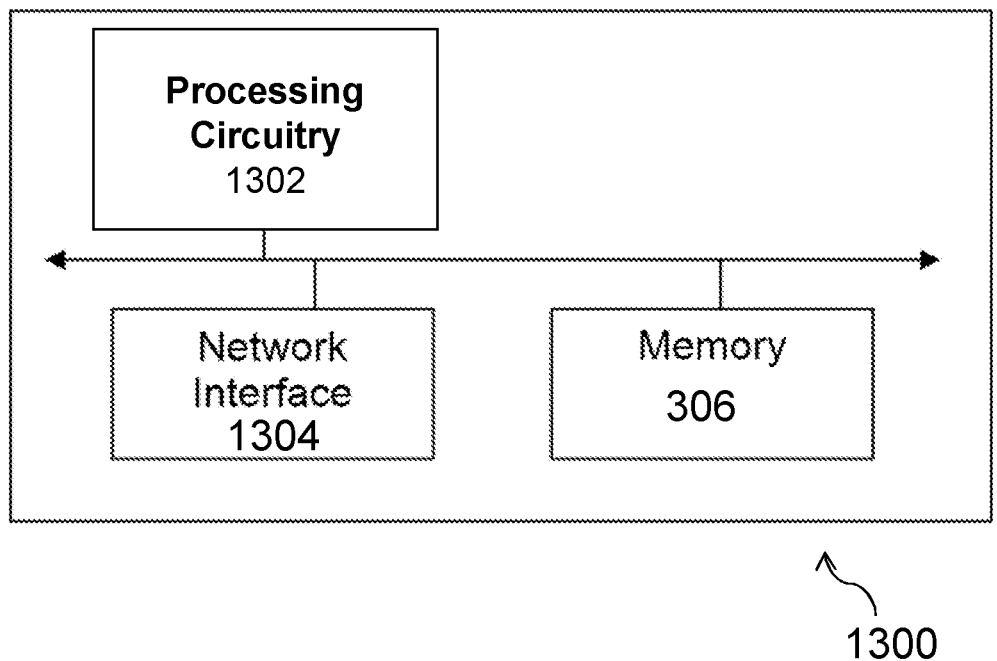
FIG. 15 illustrates an exemplary radio network controller or core network node, according to certain embodiments.

FIG. 15 illustrates an example radio network controller or core network node 1300, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node includes processing circuitry 1302 (e.g., which may include one or more processors), network interface 1304, and memory 1306. In some embodiments, processing circuitry 1302 executes instructions to provide some or all of the functionality described above as being provided by the network node, memory 1306 stores the instructions executed by processing circuitry 1302, and network interface 1304 communicates signals to any suitable node, such as a gateway, switch, router, Internet, Public Switched Telephone Network (PSTN), network nodes 815, radio network controllers or core network nodes, etc.

Processing circuitry 1302 may include any suitable combination of hardware and software implemented in one or more modules to execute instructions and manipulate data to perform some or all of the described functions of the radio network controller or core network node. In some embodiments, processing circuitry 1302 may include, for example, one or more computers, one or more central processing units (CPUs), one or more microprocessors, one or more applications, and/or other logic.

Memory 1306 is generally operable to store instructions, such as a computer program, software, an application including one or more of logic, rules, algorithms, code, tables, etc. and/or other instructions capable of being executed by a processor. Examples of memory 1306 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1304 is communicatively coupled to processing circuitry 1302 and may refer to any suitable device operable to receive input for the network node, send output from the network node, perform suitable processing of the input or output or both, communicate to other devices, or any combination of the preceding. Network interface 1304 may include appropriate hardware (e.g., port, modem, network interface card, etc.) and software, including protocol conversion and data processing capabilities, to communicate through a network.

Other embodiments of the network node may include additional components beyond those shown in FIG. 15 that may be responsible for providing certain aspects of the network node's functionality, including any of the functionality described above and/or any additional functionality (including any functionality necessary to support the solution described above).

FIG. 16 schematically illustrates a telecommunication network connected via an intermediate network to a host computer, according to certain embodiments. In accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291 located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 16 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

FIG. 17 is a generalized block diagram of a host computer communicating via a base station with a user equipment over a partially wireless connection, according to certain embodiments. Example implementations, in accordance with an embodiment, of the UE, base station and host computer discussed in the preceding paragraphs will now be described with reference to FIG. 17. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 17) served by the base station 3320. The communication interface 3326 may be configured to facilitate a connection 3360 to the host computer 3310. The connection 3360 may be direct or it may pass through a core network (not shown in FIG. 17) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

It is noted that the host computer 3310, base station 3320 and UE 3330 illustrated in FIG. 17 may be identical to the host computer 3230, one of the base stations 3212*a*, 3212*b*, 3212*c* and one of the UEs 3291, 3292 of FIG. 16, respectively. This is to say, the inner workings of these entities may be as shown in FIG. 17 and independently, the surrounding network topology may be that of FIG. 16.

In FIG. 17, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate and latency and thereby provide benefits such as reduced user waiting time and/or better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In an optional first step 3810 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3810, the UE executes a client application which provides the user data in reaction to the received input data provided by the host computer. In providing the user data, the executed client application may further consider user input received from the user. Regardless of the specific manner in which the user data was provided, the UE initiates, in an optional third sub step 3630, transmission of the user data to the host computer. In a fourth step 3640 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In an optional first step 3910 of the method, in accordance with the teachings of the embodiments described throughout this disclosure, the base station receives user data from the UE. In an optional second step 3920, the base station initiates transmission of the received user data to the host computer. In a third step 3930, the host computer receives the user data carried in the transmission initiated by the base station.

Example Embodiments

1. A method by a network node for allocating tunnel endpoint identifiers (TEIDs), the method comprising:
determining whether a Central Unit-User Plane (CU-UP) of the network node is connected to a plurality of Central Unit-Control Planes (CU-CPs) of the network node or a single CU-CP
if the CU-UP is connected to the plurality of CU-CPs, managing an allocation of the TEIDs by the CU-UP;
if the CU-UP is connected to the single CU-CP, managing the allocation of the TEIDs by the CU-CP; and
establishing a data bearer using the TEIDs allocated by the CU-UP or the CU-CP.

2. The method of embodiment 1, wherein the CU-UP is connected to the plurality CU-CPs and the allocation of the TEIDs by the CU-UP comprises:
sequentially exchanging uplink TEIDs (UL TEIDs and downlink TEIDs (DL TEIDs), wherein the UL TEIDs are exchanged before the DL TEIDs.

3. The method of embodiment 2, wherein sequentially exchanging the UL TEIDs and DL TEIDs comprises:
sending, by the CU-CP, a bearer setup request to a CU-UP;
receiving, by the CU-CP, a bearer setup response from the CU-UP, the bearer set up response comprising an uplink TEID (UL TEID) per bearer;
sending, by the CU-CP, a context setup request to a DU, the context setup request comprising the UL TEID per bearer;
receiving, by the CU-CP, a context setup response from the DU that includes a downlink TEID (DL TEID) per bearer;
sending, by the CU-CP, a bearer modification request to the CU-UP that includes the DL TEID per DRB as received from the DU; and
receiving, by the CU-CP, a bearer modification response from the CU-UP.

4. The method of embodiment 1, wherein the CU-UP is connected to the plurality CU-CPs and the allocation of the TEIDs by the CU-UP comprises:
sequentially exchanging uplink TEIDS (UL TEIDs) and downlink TEIDS (DL TEIDs), wherein the DL TEIDs are exchanged before the UL TEIDs.

5. The method of embodiment 1, wherein the CU-UP is connected to the plurality of CU-CPs and the allocation of the TEIDs comprises:
exchanging UL TEIDs and DL TEIDs in parallel.

6. The method of embodiment 5, wherein exchanging the UL TEIDs and DL TEIDs in parallel comprises:
sending, by a CU-CP, a bearer setup request to a CU-UP;
receiving, by the CU-CP, a bearer setup response that includes an UL TEID per bearer;
sending, by the CU-CP, a UE context setup request to a DU;

receiving, by the CU-CP, a UE context setup response from the DU, the UE context setup response comprising a DL TEID per bearer;

sending, by the CU-CP, a bearer modification request to the CU-UP, the bearer modification request comprising the DL TEID per bearer received from the DU;

receiving, by the CU-CP, a bearer modification response from the CU-UP;

sending, by the CU-CP, a UE context modification request to the DU, the UE context modification request comprising the UL TEID per bearer; and receiving, by the CU-CP, a UE context modification response from the DU.

7. The method according to embodiment 6, wherein the CU-CP sends the UL TEID per bearer to the DU using a downlink radio resource control (RRC) message that also comprises an RRC Reconfiguration message for a UE.

8. The method according to embodiment 6, wherein the CU-CP sends the UL TEID per bearer to the DU using a new call 1 or class 2 procedure.

9. The method according to embodiments 6 and 8, wherein the CU-CP sends the DL TEID to the CU-UP using a new call 1 or class 2 procedure.

10. The method of embodiment 1, wherein the CU-UP is connected to the single CU-CP, the allocation of the TEIDS by the CU-CP comprises:

exchanging UL TEIDs and DL TEIDs semi-statically.

11. The method of embodiment 10, wherein exchanging UL TEIDs and DL TEIDs semi-statically comprises:

sending, by the CU-CP, a setup request to the CU-UP;

receiving, by the CU-CP, a setup response from the CU-UP, the setup response comprising a range of uplink TEIDs (UL TEIDs) that are reserved for bearers established by the CU-CP;

allocating, by the CU-CP, one UL TEID per bearer;

sending, by the CU-CP, a bearer setup request to the CU-UP, the bearer setup request comprising the DL and UL TEIDs for each established bearer; and receiving, by the CU-CP, a bearer modification response from the CU-UP.

12. The method of embodiment 11, wherein allocating, by the CU-CP, one UL TEID per bearer comprises:

sending, by the CU-CP, a UE context setup request to the DU, the UE context setup request comprising the UL TEID per bearer; and receiving, by the CU-CP, a UE context setup response from the DU, the UE context setup response comprising a DL TEID per bearer.

13. The method of embodiments 11 and 12, wherein the range of TEIDs are updated using a configuration update over an E1 interface.

14. The method of embodiment 1, wherein the CU-UP is connected to the plurality CU-CPs and the allocation of the TEIDS by the CU-UP comprises:

allocating UL TEIDs and DL TEIDs using a trial and error approach.

15. The method of embodiment 14, further comprising:

selecting, by the CU-CP, a TEID that is already in use by another CU-CP;

resolving, by the CU-UP, the conflict by assigning a new UL TEID;

sending, by the CU-UP, the new UL TEID to the CU-CP;

sending, by the CU-CP, the new UL TEID to the DU.

16. The method of embodiment 15, wherein the new UL TEID is sent to the DU using a UE context modification procedure or a downlink radio resource control (DL RRC) message transfer that also contains an RRC configuration message for a UE.

17. A computer program product comprising a non-transitory computer readable medium storing computer readable program code, the computer readable program code comprises program code for performing any of the methods of embodiments 1 to 16.

18. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs:

if a Central Unit-User Plane (CU-UP) of the network node is connected to the plurality of Central Unit-Control Planes (CU-CPs) of the network node, managing an allocation of the TEIDs by the CU-UP;

if the CU-UP is connected to a single CU-CP, managing the allocation of the TEIDs by the CU-CP; and establishing a data bearer using the TEIDs allocated by the CU-UP or the CU-CP.

19. The method of embodiment 18, further comprising:

at the base station, transmitting the user data.

20. The method of embodiment 19, wherein the user data is provided at the host computer by executing a host application, the method further comprising:

at the UE, executing a client application associated with the host application.

21. A method implemented in a communication system including a host computer, a base station and a user equipment (UE), the method comprising:

at the host computer, receiving, from the base station, user data originating from a transmission which the base station has received from the UE, wherein the base station:

if a Central Unit-User Plane (CU-UP) of the network node is connected to the plurality of Central Unit-Control Planes (CU-CPs) of the network node, manages an allocation of the TEIDs by the CU-UP;

if the CU-UP is connected to a single CU-CP, manages the allocation of the TEIDs by the CU-CP; and establishes a data bearer using the TEIDs allocated by the CU-UP or the CU-CP.

22. The method of embodiment 21, further comprising:

at the base station, receiving the user data from the UE.

23. The method of embodiment 22, further comprising:

at the base station, initiating a transmission of the received user data to the host computer.

24. A network node for allocating tunnel endpoint identifiers (TEIDs), the network node comprising:

memory operable to store instructions; and processing circuitry operable to execute the instructions to cause the network node to:

determine whether a Central Unit-User Plane (CU-UP) of the network node is connected to a plurality of Central Unit-Control Planes (CU-CPs) of the network node or a single CU-CP;

if the CU-UP is connected to the plurality of CU-CPs, manage an allocation of the TEIDs by the CU-UP;

if the CU-UP is connected to the single CU-CP, manage the allocation of the TEIDs by the CU-CP; and establish a data bearer using the TEIDs allocated by the CU-UP or the CU-CP.

25. The network node of embodiment 24, wherein the CU-UP is connected to the plurality CU-CPs and the allocation of the TEIDs by the CU-UP comprises:

sequentially exchanging uplink TEIDs (UL TEIDs and downlink TEIDs (DL TEIDs), wherein the UL TEIDs are exchanged before the DL TEIDs.

26. The network node of embodiment 25, wherein when sequentially exchanging the UL TEIDs and DL TEIDs the processing circuitry is operable to execute the instructions to cause the network node to:
send, by the CU-CP, a bearer setup request to a CU-UP;
receive, by the CU-CP, a bearer setup response from the CU-UP, the bearer set up response comprising an uplink TEID (UL TEID) per bearer;
send, by the CU-CP, a context setup request to a DU, the context setup request comprising the UL TEID per bearer;
receive, by the CU-CP, a context setup response from the DU that includes a downlink TEID (DL TEID) per bearer;
send, by the CU-CP, a bearer modification request to the CU-UP that includes the DL TEID per DRB as received from the DU; and
receive, by the CU-CP, a bearer modification response from the CU-UP.

27. The network node of embodiment 4, wherein the CU-UP is connected to the plurality CU-CPs and the allocation of the TEIDs by the CU-UP comprises:
sequentially exchanging uplink TEIDS (UL TEIDs) and downlink TEIDS (DL TEIDs), wherein the DL TEIDs are exchanged before the UL TEIDs.

28. The method of embodiment 24, wherein the CU-UP is connected to the plurality of CU-CPs and the allocation of the TEIDs comprises:
exchanging UL TEIDs and DL TEIDs in parallel.

29. The method of embodiment 28, wherein when exchanging the UL TEIDs and DL TEIDs in parallel the processing circuitry is operable to execute the instructions to cause the network node to:
send, by a CU-CP, a bearer setup request to a CU-UP;
receive, by the CU-CP, a bearer setup response that includes an UL TEID per bearer;
send, by the CU-CP, a UE context setup request to a DU;
receive, by the CU-CP, a UE context setup response from the DU, the UE context setup response comprising a DL TEID per bearer;
send, by the CU-CP, a bearer modification request to the CU-UP, the bearer modification request comprising the DL TEID per bearer received from the DU;
receive, by the CU-CP, a bearer modification response from the CU-UP;
send, by the CU-CP, a UE context modification request to the DU, the UE context modification request comprising the UL TEID per bearer; and
receive, by the CU-CP, a UE context modification response from the DU.

30. The network node according to embodiment 29, wherein the CU-CP sends the UL TEID per bearer to the DU using a downlink radio resource control (RRC) message that also comprises an RRC Reconfiguration message for a UE.

31. The network node according to embodiment 29, wherein the CU-CP sends the UL TEID per bearer to the DU using a new call 1 or class 2 procedure.

32. The network node according to embodiments 29 and 31, wherein the CU-CP sends the DL TEID to the CU-UP using a new call 1 or class 2 procedure.

33. The network node of embodiment 24, wherein the CU-UP is connected to the single CU-CP, the allocation of the TEIDS by the CU-CP comprises:
exchanging UL TEIDs and DL TEIDs semi-statically.

34. The network node of embodiment 33, wherein when exchanging UL TEIDs and DL TEIDs semi-statically the processing circuitry is operable to execute the instructions to cause the network node to:
send, by the CU-CP, a setup request to the CU-UP;
receive, by the CU-CP, a setup response from the CU-UP, the setup response comprising a range of uplink TEIDs (UL TEIDs) that are reserved for bearers established by the CU-CP;
allocate, by the CU-CP, one UL TEID per bearer;
send, by the CU-CP, a bearer setup request to the CU-UP, the bearer setup request comprising the DL and UL TEIDs for each established bearer; and
receive, by the CU-CP, a bearer modification response from the CU-UP.

35. The network node of embodiment 34, wherein when allocating, by the CU-CP, one UL TEID per bearer the processing circuitry is operable to execute the instructions to cause the network node to:
send, by the CU-CP, a UE context setup request to the DU, the UE context setup request comprising the UL TEID per bearer; and
receive, by the CU-CP, a UE context setup response from the DU, the UE context setup response comprising a DL TEID per bearer.

36. The network node of embodiments 34 and 35, wherein the range of TEIDs are updated using a configuration update over an E1 interface.

37. The network node of embodiment 24, wherein the CU-UP is connected to the plurality CU-CPs and the allocation of the TEIDS by the CU-UP comprises:
allocating UL TEIDs and DL TEIDs using a trial and error approach.

38. The network node of embodiment 37, wherein the processing circuitry is operable to execute the instructions to cause the network node to:
select, by the CU-CP, a TEID that is already in use by another CU-CP;
resolve, by the CU-UP, the conflict by assigning a new UL TEID;
send, by the CU-UP, the new UL TEID to the CU-CP;
send, by the CU-CP, the new UL TEID to the DU.

39. The network node of embodiment 38, wherein the new UL TEID is sent to the DU using a UE context modification procedure or a downlink radio resource control (DL RRC) message transfer that also contains an RRC configuration message for a UE.

40. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to:
if a Central Unit-User Plane (CU-UP) is connected to the plurality of Central Unit-Control Planes (CU-CPs), mange an allocation of the TEIDs by the CU-UP;
if the CU-UP is connected to a single CU-CP, manage the allocation of the TEIDs by the CU-CP; and
establish a data bearer using the TEIDs allocated by the CU-UP or the CU-CP.

41. The communication system of embodiment 40, further including the base station.

42. The communication system of embodiment 41, further including the UE, wherein the UE is configured to communicate with the base station.

43. The communication system of embodiment 42, wherein:

the processing circuitry of the host computer is configured to execute a host application, thereby providing the user data; and the UE comprises processing circuitry configured to execute a client application associated with the host application.

44. A communication system including a host computer comprising a communication interface configured to receive user data originating from a transmission from a user equipment (UE) to a base station, wherein the base station comprises a radio interface and processing circuitry, the base station's processing circuitry configured to:

if a Central Unit-User Plane (CU-UP) is connected to the plurality of Central Unit-Control Planes (CU-CPs), mange an allocation of the TEIDs by the CU-UP;

if the CU-UP is connected to a single CU-CP, manage the allocation of the TEIDs by the CU-CP; and establish a data bearer using the TEIDs allocated by the CU-UP or the CU-CP.

45. The communication system of embodiment 44, further including the base station.

46. The communication system of embodiment 45, further including the UE, wherein the UE is configured to communicate with the base station.

47. The communication system of embodiment 46, wherein:

the processing circuitry of the host computer is configured to execute a host application;

the UE is configured to execute a client application associated with the host application, thereby providing the user data to be received by the host computer.

48. A method by a network node for allocating tunnel endpoint identifiers (TEIDs), the method comprising:

sending, by a Central Unit-Control Plane (CU-CP) of the network node, a bearer setup request to a Central Unit-User Plane (CU-UP) of the network node;

receiving, by the CU-CP, a bearer setup response from the CU-UP, the bearer set up response comprising an uplink tunnel endpoints identifier (UL TEID) per bearer;

sending, by the CU-CP, a context setup request to a DU, the context setup request comprising the UL TEID per bearer;

receiving, by the CU-CP, a context setup response from the DU that includes a downlink tunnel endpoints identifier (DL TEID) per bearer;

sending, by the CU-CP, a bearer modification request to the CU-UP that includes the DL TEID per bearer as received from the DU; and receiving, by the CU-CP, a bearer modification response from the CU-UP.

49. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs:

send, by a Central Unit-Control Plane (CU-CP), a bearer setup request to a Central Unit-User Plane (CU-UP);

receive, by the CU-CP, a bearer setup response from the CU-UP, the bearer set up response comprising an uplink tunnel endpoints identifier (UL TEID) per bearer;

send, by the CU-CP, a context setup request to a DU, the context setup request comprising the UL TEID per bearer;

receive, by the CU-CP, a context setup response from the DU that includes a downlink tunnel endpoints identifier (DL TEID) per bearer;

send, by the CU-CP, a bearer modification request to the CU-UP that includes the DL TEID per bearer as received from the DU; and receive, by the CU-CP, a bearer modification response from the CU-UP.

50. The method of embodiment 48, further comprising:

at the base station, transmitting the user data.

51. The method of embodiment 50, wherein the user data is provided at the host computer by executing a host application, the method further comprising:

at the UE, executing a client application associated with the host application.

52. A method implemented in a communication system including a host computer, a base station and a user equipment (UE), the method comprising:

at the host computer, receiving, from the base station, user data originating from a transmission which the base station has received from the UE, wherein the base station:

send, by a Central Unit-Control Plane (CU-CP), a bearer setup request to a Central Unit-User Plane (CU-UP);

receive, by the CU-CP, a bearer setup response from the CU-UP, the bearer set up response comprising an uplink tunnel endpoints identifier (UL TEID) per bearer;

send, by the CU-CP, a context setup request to a DU, the context setup request comprising the UL TEID per bearer;

receive, by the CU-CP, a context setup response from the DU that includes a downlink tunnel endpoints identifier (DL TEID) per bearer;

send, by the CU-CP, a bearer modification request to the CU-UP that includes the DL TEID per bearer as received from the DU; and receive, by the CU-CP, a bearer modification response from the CU-UP.

53. The method of embodiment 52, further comprising:

at the base station, receiving the user data from the UE.

54. The method of embodiment 53, further comprising:

at the base station, initiating a transmission of the received user data to the host computer.

55. A network node for allocating tunnel endpoint identifiers, the network node comprising:

memory operable to store instructions; and processing circuitry operable to execute the instructions to cause the network node to:

send, by a Central Unit-Control Plane (CU-CP) of the network node, a bearer setup request to a Central Unit-User Plane (CU-UP) of the network node;

receive, by the CU-CP, a bearer setup response from the CU-UP, the bearer set up response comprising an uplink tunnel endpoints identifier (UL TEID) per bearer;

send, by the CU-CP, a context setup request to a DU, the context setup request comprising the UL TEID per bearer;

receive, by the CU-CP, a context setup response from the DU that includes a downlink tunnel endpoints identifier (DL TEID) per bearer;

send, by the CU-CP, a bearer modification request to the CU-UP that includes the DL TEID per bearer as received from the DU; and receive, by the CU-CP, a bearer modification response from the CU-UP.

56. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to:

send, by a Central Unit-Control Plane (CU-CP), a bearer setup request to a Central Unit-User Plane (CU-UP);

receive, by the CU-CP, a bearer setup response from the CU-UP, the bearer set up response comprising an uplink tunnel endpoints identifier (UL TEID) per bearer;

send, by the CU-CP, a context setup request to a DU, the context setup request comprising the UL TEID per bearer;

receive, by the CU-CP, a context setup response from the DU that includes a downlink tunnel endpoints identifier (DL TEID) per bearer;

send, by the CU-CP, a bearer modification request to the CU-UP that includes the DL TEID per bearer as received from the DU; and receive, by the CU-CP, a bearer modification response from the CU-UP.

57. The communication system of embodiment 56, further including the base station.

58. The communication system of embodiment 57, further including the UE, wherein the UE is configured to communicate with the base station.

59. The communication system of embodiment 58, wherein:

the processing circuitry of the host computer is configured to execute a host application, thereby providing the user data; and the UE comprises processing circuitry configured to execute a client application associated with the host application.

60. A communication system including a host computer comprising a communication interface configured to receive user data originating from a transmission from a user equipment (UE) to a base station, wherein the base station comprises a radio interface and processing circuitry, the base station's processing circuitry configured to:

send, by a Central Unit-Control Plane (CU-CP), a bearer setup request to a Central Unit-User Plane (CU-UP);

receive, by the CU-CP, a bearer setup response from the CU-UP, the bearer set up response comprising an uplink tunnel endpoints identifier (UL TEID) per bearer;

send, by the CU-CP, a context setup request to a DU, the context setup request comprising the UL TEID per bearer;

receive, by the CU-CP, a context setup response from the DU that includes a downlink tunnel endpoints identifier (DL TEID) per bearer;

send, by the CU-CP, a bearer modification request to the CU-UP that includes the DL TEID per bearer as received from the DU; and receive, by the CU-CP, a bearer modification response from the CU-UP.

61. The communication system of embodiment 60, further including the base station.

62. The communication system of embodiment 61, further including the UE, wherein the UE is configured to communicate with the base station.

63. The communication system of embodiment 62, wherein:

the processing circuitry of the host computer is configured to execute a host application;

the UE is configured to execute a client application associated with the host application, thereby providing the user data to be received by the host computer.

64. A method by a network node for allocating tunnel endpoint identifiers (TEIDs), the method comprising:

sending, by a Central Unit-Control Plane (CU-CP) of the network node, a bearer setup request to a Central Unit-User Plane (CU-UP) of the network node;

receiving, by the CU-CP, a bearer setup response that includes an UL TEID per bearer;

sending, by the CU-CP, a UE context setup request to a DU;

receiving, by the CU-CP, a UE context setup response from the DU, the UE context setup response comprising a DL TEID per bearer;

sending, by the CU-CP, a bearer modification request to the CU-UP, the bearer modification request comprising the DL TEID per bearer received from the DU;

receiving, by the CU-CP, a bearer modification response from the CU-UP;

sending, by the CU-CP, a UE context modification request to the DU, the UE context modification request comprising the UL TEID per bearer; and receiving, by the CU-CP, a UE context modification response from the DU.

65. The method according to embodiment 64, wherein the CU-CP sends the UL TEID per bearer to the DU using a downlink radio resource control (RRC) message that also comprises an RRC Reconfiguration message for a UE.

66. The method according to embodiment 65, wherein the CU-CP sends the UL TEID per bearer to the DU using a new call 1 or class 2 procedure.

67. The method according to embodiments 64 and 66, wherein the CU-CP sends the DL TEID to the CU-UP using a new call 1 or class 2 procedure.

68. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to:

send, by a Central Unit-Control Plane (CU-CP), a bearer setup request to a Central Unit-User Plane (CU-UP);

receive, by the CU-CP, a bearer setup response that includes an UL TEID per bearer;

send, by the CU-CP, a UE context setup request to a DU;

receive, by the CU-CP, a UE context setup response from the DU, the UE context setup response comprising a DL TEID per bearer;

send, by the CU-CP, a bearer modification request to the CU-UP, the bearer modification request comprising the DL TEID per bearer received from the DU;

receive, by the CU-CP, a bearer modification response from the CU-UP;

send, by the CU-CP, a UE context modification request to the DU, the UE context modification request comprising the UL TEID per bearer; and receive, by the CU-CP, a UE context modification response from the DU.

69. The communication system of embodiment 68, further including the base station.

70 The communication system of embodiment 69, further including the UE, wherein the UE is configured to communicate with the base station.

71. The communication system of embodiment 70, wherein:

the processing circuitry of the host computer is configured to execute a host application, thereby providing the user data; and the UE comprises processing circuitry configured to execute a client application associated with the host application.

72. A communication system including a host computer comprising a communication interface configured to receive user data originating from a transmission from a user equipment (UE) to a base station, wherein the base station comprises a radio interface and processing circuitry, the base station's processing circuitry configured to:

send, by a Central Unit-Control Plane (CU-CP), a bearer setup request to a Central Unit-User Plane (CU-UP);

receive, by the CU-CP, a bearer setup response that includes an UL TEID per bearer;

send, by the CU-CP, a UE context setup request to a DU;

receive, by the CU-CP, a UE context setup response from the DU, the UE context setup response comprising a DL TEID per bearer;

send, by the CU-CP, a bearer modification request to the CU-UP, the bearer modification request comprising the DL TEID per bearer received from the DU;

receive, by the CU-CP, a bearer modification response from the CU-UP;

send, by the CU-CP, a UE context modification request to the DU, the UE context modification request comprising the UL TEID per bearer; and receive, by the CU-CP, a UE context modification response from the DU.

73. The communication system of embodiment 72, further including the base station.

74. The communication system of embodiment 73, further including the UE, wherein the UE is configured to communicate with the base station.

75. The communication system of embodiment 74, wherein:

the processing circuitry of the host computer is configured to execute a host application;

the UE is configured to execute a client application associated with the host application, thereby providing the user data to be received by the host computer.

76. A network node for allocating tunnel endpoint identifiers, the network node comprising:

memory operable to store instructions; and processing circuitry operable to execute the instructions to cause the network node to:

send, by a Central Unit-Control Plane (CU-CP) of the network node, a bearer setup request to a Central Unit-User Plane (CU-UP) of the network node;

receive, by the CU-CP, a bearer setup response that includes an UL TEID per bearer;

send, by the CU-CP, a UE context setup request to a DU;

receive, by the CU-CP, a UE context setup response from the DU, the UE context setup response comprising a DL TEID per bearer;

send, by the CU-CP, a bearer modification request to the CU-UP, the bearer modification request comprising the DL TEID per bearer received from the DU;

receive, by the CU-CP, a bearer modification response from the CU-UP;

send, by the CU-CP, a UE context modification request to the DU, the UE context modification request comprising the UL TEID per bearer; and receive, by the CU-CP, a UE context modification response from the DU.

77. The network node according to embodiment 76, wherein the CU-CP sends the UL TEID per bearer to the DU using a downlink radio resource control (RRC) message that also comprises an RRC Reconfiguration message for a UE.

78. The network node according to embodiment 77, wherein the CU-CP sends the UL TEID per bearer to the DU using a new call 1 or class 2 procedure.

79. The network node according to embodiments 76 and 78, wherein the CU-CP sends the DL TEID to the CU-UP using a new call 1 or class 2 procedure.

80. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to:

send, by a Central Unit-Control Plane (CU-CP), a bearer setup request to a Central Unit-User Plane (CU-UP);

receive, by the CU-CP, a bearer setup response that includes an UL TEID per bearer;

send, by the CU-CP, a UE context setup request to a DU;

receive, by the CU-CP, a UE context setup response from the DU, the UE context setup response comprising a DL TEID per bearer;

send, by the CU-CP, a bearer modification request to the CU-UP, the bearer modification request comprising the DL TEID per bearer received from the DU;

receive, by the CU-CP, a bearer modification response from the CU-UP;

send, by the CU-CP, a UE context modification request to the DU, the UE context modification request comprising the UL TEID per bearer; and receive, by the CU-CP, a UE context modification response from the DU.

81. The communication system of embodiment 80, further including the base station.

82. The communication system of embodiment 81, further including the UE, wherein the UE is configured to communicate with the base station.

83. The communication system of embodiment 82, wherein:

the processing circuitry of the host computer is configured to execute a host application, thereby providing the user data; and the UE comprises processing circuitry configured to execute a client application associated with the host application.

84. A communication system including a host computer comprising a communication interface configured to receive user data originating from a transmission from a user equipment (UE) to a base station, wherein the base station comprises a radio interface and processing circuitry, the base station's processing circuitry configured to:

send, by a Central Unit-Control Plane (CU-CP), a bearer setup request to a Central Unit-User Plane (CU-UP);

receive, by the CU-CP, a bearer setup response that includes an UL TEID per bearer;

send, by the CU-CP, a UE context setup request to a DU;

receive, by the CU-CP, a UE context setup response from the DU, the UE context setup response comprising a DL TEID per bearer;

send, by the CU-CP, a bearer modification request to the CU-UP, the bearer modification request comprising the DL TEID per bearer received from the DU;

receive, by the CU-CP, a bearer modification response from the CU-UP;

send, by the CU-CP, a UE context modification request to the DU, the UE context modification request comprising the UL TEID per bearer; and receive, by the CU-CP, a UE context modification response from the DU.

85. The communication system of embodiment 84, further including the base station.

86. The communication system of embodiment 85, further including the UE, wherein the UE is configured to communicate with the base station.

87. The communication system of embodiment 86, wherein: the processing circuitry of the host computer is configured to execute a host application;

the UE is configured to execute a client application associated with the host application, thereby providing the user data to be received by the host computer.

88. A method by a network node for allocating tunnel endpoint identifiers (TEIDs), the method comprising:

sending, by a Central Unit-Control Plane (CU-CP) of the network node, a setup request to a Central Unit-User Plane (CU-UP) of the network node;

receiving, by the CU-CP, a setup response from the CU-UP, the setup response comprising a range of uplink TEIDs (UL TEIDs) that are reserved for bearers established by the CU-CP;

allocating, by the CU-CP, one UL TEID per bearer;

sending, by the CU-CP, a bearer setup request to the CU-UP, the bearer setup request comprising the DL and UL TEIDs for each established bearer; and receiving, by the CU-CP, a bearer modification response from the CU-UP.

89. The method of embodiment 88, wherein allocating, by the CU-CP, one UL TEID per bearer comprises:

sending, by the CU-CP, a UE context setup request to the DU, the UE context setup request comprising the UL TEID per bearer; and receiving, by the CU-CP, a UE context setup response from the DU, the UE context setup response comprising a DL TEID per bearer.

90. The method of embodiments 88 and 89, wherein the range of TEIDs are updated using a configuration update over an E1 interface.

91. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to:

send, by a Central Unit-Control Plane (CU-CP), a setup request to a Central Unit-User Plane (CU-UP);

receive, by the CU-CP, a setup response from the CU-UP, the setup response comprising a range of uplink TEIDs (UL TEIDs) that are reserved for bearers established by the CU-CP;

allocate, by the CU-CP, one UL TEID per bearer;

send, by the CU-CP, a bearer setup request to the CU-UP, the bearer setup request comprising the DL and UL TEIDs for each established bearer; and receive, by the CU-CP, a bearer modification response from the CU-UP.

92. The communication system of embodiment 91, further including the base station.

93. The communication system of embodiment 92, further including the UE, wherein the UE is configured to communicate with the base station.

94. The communication system of embodiment 93, wherein:

the processing circuitry of the host computer is configured to execute a host application, thereby providing the user data; and the UE comprises processing circuitry configured to execute a client application associated with the host application.

95. A communication system including a host computer comprising a communication interface configured to receive user data originating from a transmission from a user equipment (UE) to a base station, wherein the base station comprises a radio interface and processing circuitry, the base station's processing circuitry configured to:

send, by a Central Unit-Control Plane (CU-CP), a setup request to a Central Unit-User Plane (CU-UP);

receive, by the CU-CP, a setup response from the CU-UP, the setup response comprising a range of uplink TEIDs (UL TEIDs) that are reserved for bearers established by the CU-CP;

allocate, by the CU-CP, one UL TEID per bearer;

send, by the CU-CP, a bearer setup request to the CU-UP, the bearer setup request comprising the DL and UL TEIDs for each established bearer; and receive, by the CU-CP, a bearer modification response from the CU-UP.

96. The communication system of embodiment 95, further including the base station.

97. The communication system of embodiment 96, further including the UE, wherein the UE is configured to communicate with the base station.

98. The communication system of embodiment 97, wherein:

the processing circuitry of the host computer is configured to execute a host application;

the UE is configured to execute a client application associated with the host application, thereby providing the user data to be received by the host computer.

99. A network node for allocating tunnel endpoint identifiers, the network node comprising:

memory operable to store instructions; and processing circuitry operable to execute the instructions to cause the network node to:

send, by a Central Unit-Control Plane (CU-CP) of the network node, a setup request to a Central Unit-User Plane (CU-UP) of the network node;

receive, by the CU-CP, a setup response from the CU-UP, the setup response comprising a range of uplink TEIDs (UL TEIDs) that are reserved for bearers established by the CU-CP;

allocate, by the CU-CP, one UL TEID per bearer;

send, by the CU-CP, a bearer setup request to the CU-UP, the bearer setup request comprising the DL and UL TEIDs for each established bearer; and receive, by the CU-CP, a bearer modification response from the CU-UP.

100. The network node of embodiment 99, wherein allocating, by the CU-CP, one UL TEID per bearer comprises:

sending, by the CU-CP, a UE context setup request to the DU, the UE context setup request comprising the UL TEID per bearer; and receiving, by the CU-CP, a UE context setup response from the DU, the UE context setup response comprising a DL TEID per bearer.

101. The network node of embodiments 99 and 100, wherein the range of TEIDs are updated using a configuration update over an E1 interface.

102. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to:
send, by a Central Unit-Control Plane (CU-CP), a setup request to a Central Unit-User Plane (CU-UP);
receive, by the CU-CP, a setup response from the CU-UP, the setup response comprising a range of uplink TEIDs (UL TEIDs) that are reserved for bearers established by the CU-CP;
allocate, by the CU-CP, one UL TEID per bearer;
send, by the CU-CP, a bearer setup request to the CU-UP, the bearer setup request comprising the DL and UL TEIDs for each established bearer; and
receive, by the CU-CP, a bearer modification response from the CU-UP.

103. The communication system of embodiment 102, further including the base station.

104. The communication system of embodiment 103, further including the UE, wherein the UE is configured to communicate with the base station.

105. The communication system of embodiment 104, wherein:
the processing circuitry of the host computer is configured to execute a host application, thereby providing the user data; and
the UE comprises processing circuitry configured to execute a client application associated with the host application.

106. A communication system including a host computer comprising a communication interface configured to receive user data originating from a transmission from a user equipment (UE) to a base station, wherein the base station comprises a radio interface and processing circuitry, the base station's processing circuitry configured to:
send, by a Central Unit-Control Plane (CU-CP), a setup request to a Central Unit-User Plane (CU-UP);
receive, by the CU-CP, a setup response from the CU-UP, the setup response comprising a range of uplink TEIDs (UL TEIDs) that are reserved for bearers established by the CU-CP;
allocate, by the CU-CP, one UL TEID per bearer;
send, by the CU-CP, a bearer setup request to the CU-UP, the bearer setup request comprising the DL and UL TEIDs for each established bearer; and
receive, by the CU-CP, a bearer modification response from the CU-UP.

107. The communication system of embodiment 106, further including the base station.

108. The communication system of embodiment 107, further including the UE, wherein the UE is configured to communicate with the base station.

109. The communication system of embodiment 108, wherein:
the processing circuitry of the host computer is configured to execute a host application;
the UE is configured to execute a client application associated with the host application, thereby providing the user data to be received by the host computer.

110. A method by a network node for allocating tunnel endpoint identifiers (TEIDs), the method comprising:
selecting, by the Central Unit-Control Plane (CU-CP) of the network node, a TEID that is already in use by another CU-CP;
resolving, by a Central Unit-User Plane (CU-UP) of the network node, the conflict by assigning a new UL TEID;
sending, by the CU-UP, the new UL TEID to the CU-CP;
sending, by the CU-CP, the new UL TEID to the Distributed Unit (DU).

111. The method of embodiment 110, wherein the new UL TEID is sent to the Distributed Unit (DU) using a UE context modification procedure or a downlink radio resource control (DL RRC) message transfer that also contains an RRC configuration message for a UE.

112. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to:
select, by the Central Unit-Control Plane (CU-CP), a TEID that is already in use by another CU-CP;
resolve, by a Central Unit-User Plane (CU-UP), the conflict by assigning a new UL TEID;
send, by the CU-UP, the new UL TEID to the CU-CP;
send, by the CU-CP, the new UL TEID to the Distributed Unit (DU).

113. The communication system of embodiment 112, further including the base station.

114 The communication system of embodiment 113, further including the UE, wherein the UE is configured to communicate with the base station.

115. The communication system of embodiment 114, wherein:
the processing circuitry of the host computer is configured to execute a host application, thereby providing the user data; and
the UE comprises processing circuitry configured to execute a client application associated with the host application.

116. A communication system including a host computer comprising a communication interface configured to receive user data originating from a transmission from a user equipment (UE) to a base station, wherein the base station comprises a radio interface and processing circuitry, the base station's processing circuitry configured to:
select, by the Central Unit-Control Plane (CU-CP), a TEID that is already in use by another CU-CP;
resolve, by a Central Unit-User Plane (CU-UP), the conflict by assigning a new UL TEID;
send, by the CU-UP, the new UL TED to the CU-CP;
send, by the CU-CP, the new UL TEID to the Distributed Unit (DU).

117. The communication system of embodiment 116, further including the base station.

118. The communication system of embodiment 117, further including the UE, wherein the UE is configured to communicate with the base station.

119. The communication system of embodiment 118, wherein:
the processing circuitry of the host computer is configured to execute a host application;

the UE is configured to execute a client application associated with the host application, thereby providing the user data to be received by the host computer.

120. A network node for allocating tunnel endpoint identifiers, the network node comprising:
  memory operable to store instructions; and
  processing circuitry operable to execute the instructions to cause the network node to:
    select, by the Central Unit-Control Plane (CU-CP) of the network node, a TEID that is already in use by another CU-CP;
    resolve, by a Central Unit-User Plane (CU-UP) of the network node, the conflict by assigning a new UL TEID;
    send, by the CU-UP, the new UL TEID to the CU-CP;
    send, by the CU-CP, the new UL TEID to the Distributed Unit (DU).

121. The method of embodiment 120, wherein the new UL TEID is sent to the Distributed Unit (DU) using a UE context modification procedure or a downlink radio resource control (DL RRC) message transfer that also contains an RRC configuration message for a UE.

122. A communication system including a host computer comprising:
  processing circuitry configured to provide user data; and
  a communication interface configured to forward the user data to a cellular network for transmission to a user equipment (UE),
  wherein the cellular network comprises a base station having a radio interface and processing circuitry, the base station's processing circuitry configured to:
    select, by the Central Unit-Control Plane (CU-CP), a TEID that is already in use by another CU-CP;
    resolve, by a Central Unit-User Plane (CU-UP), the conflict by assigning a new UL TEID;
    send, by the CU-UP, the new UL TEID to the CU-CP;
    send, by the CU-CP, the new UL TEID to the Distributed Unit (DU).

123. The communication system of embodiment 122, further including the base station.

124. The communication system of embodiment 123, further including the UE, wherein the UE is configured to communicate with the base station.

125. The communication system of embodiment 124, wherein:
  the processing circuitry of the host computer is configured to execute a host application, thereby providing the user data; and
  the UE comprises processing circuitry configured to execute a client application associated with the host application.

126. A communication system including a host computer comprising a communication interface configured to receive user data originating from a transmission from a user equipment (UE) to a base station, wherein the base station comprises a radio interface and processing circuitry, the base station's processing circuitry configured to:
  select, by the Central Unit-Control Plane (CU-CP), a TEID that is already in use by another CU-CP;
  resolve, by a Central Unit-User Plane (CU-UP), the conflict by assigning a new UL TEID;
  send, by the CU-UP, the new UL TED to the CU-CP;
  send, by the CU-CP, the new UL TEID to the Distributed Unit (DU).

127. The communication system of embodiment 126, further including the base station.

128. The communication system of embodiment 127, further including the UE, wherein the UE is configured to communicate with the base station.

129. The communication system of embodiment 128, wherein:
  the processing circuitry of the host computer is configured to execute a host application;
  the UE is configured to execute a client application associated with the host application, thereby providing the user data to be received by the host computer.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method for allocating tunnel endpoint identifiers (TEIDs) by a central unit-control plane entity (CU-CP) of a radio access network (RAN) node, the method comprising:
  receiving, from a central unit-user plane entity (CU-UP) of the RAN node, at least one uplink TEID (UL TEID) associated with a data radio bearer (DRB);
  sending, to a distributed unit (DU) of the RAN node, the at least one UL TEID associated with the DRB;
  receiving, from the DU, at least one downlink TEID (DL TEID) associated with the DRB; and
  sending, to the CU-UP, the at least one DL TEID associated with the DRB.

2. The method of claim 1, wherein the at least one UL TEID and the at least one DL TEID are exchanged sequentially, such that the at least one UL TEID is received from the CU-UP and sent to the DU before the at least one DL TEID is received from the DU and sent to the CU-UP.

3. The method of claim 2, further comprising sending a bearer setup request to the CU-UP, wherein the at least one UL TEID associated with the DRB is received from the CU-UP in a bearer set up response.

4. The method of claim 2, wherein:
  the at least one UL TEID associated with the DRB is sent to the DU in a context setup request; and
  the at least one DL TEID associated with the DRB is received from the DU in a context setup response.

5. The method of claim 2, wherein:
  the at least one DL TEID associated with the DRB, as received from the DU, is sent to the CU-UP in a bearer modification request; and
  the method further comprises receiving a bearer modification response from the CU-UP.

6. The method of claim 1, wherein the at least one UL TEID and the at least one DL TEID are exchanged sequentially, such that the at least one DL TEID is received from the DU and sent to the CU-UP before the at least one UL TEID is received from the CU-UP and sent to the DU.

7. The method of claim 6, wherein:
the method further comprises, before receiving the at least one UL TEID associated with the DRB, sending a temporary UL TEID associated with the DRB to the DU in a context setup request;
the at least one DL TEID associated with the DRB is received from the DU in a context setup response;
the at least one DL TEID associated with the DRB is sent to the CU-UP in a bearer setup request; and
the at least one UL TEID associated with the DRB is received from the CU-UP in a bearer setup response.

8. The method of claim 1, wherein the at least one UL TEID associated with the DRB and the at least one DL TEID associated with the DRB are exchanged in parallel between the CU-UP and the DU via the CU-CP.

9. The method of claim 8, wherein:
exchanging the at least one UL TEID and the at least one DL TEID in parallel comprises sending a bearer setup request to the CU-UP and sending a UE context setup request to the DU, with the bearer setup request and the UE context setup request being sent at substantially the same time;
the at least one UL TEID associated with the DRB is received from the CU-UP in a bearer setup response;
the at least one DL TEID associated with the DRB is sent to the CU-UP in a bearer modification request;
the at least one DL TEID associated with the DRB is received from the DU in a context setup response; and
the at least one UL TEID associated with the DRB is sent to the DU in a UE context modification request.

10. The method of claim 1, wherein:
the at least one UL TEID comprises a plurality of UL TEIDs, each of the plurality of UL TEIDs being associated with a respective one of a plurality of DRBs, and the at least one of DL TEID comprises a plurality of DL TEIDs, each of the plurality of
DL TEIDs being associated with a respective one of the plurality of DRBs.

11. A non-transitory, computer readable medium storing computer-executable instructions that, when executed by processing circuitry associated with a central unit-control plane entity (CU-CP) of a radio access network (RAN) node, configure the CU-CP to perform operations corresponding to the method of claim 1.

12. A central unit-control plane entity (CU-CP) of a radio access network (RAN) node, the CU-CP being configured to allocate tunnel endpoint identifiers (TEIDs), the CU-CP comprising:
processing circuitry; and
memory operable to store computer-executable instructions that, when executed by the processing circuitry, configure the CU-CP to:
receive, from a central unit-user plane entity (CU-UP) of the RAN node, at least one uplink TEID (UL TEID) associated with a data radio bearer (DRB);
send, to a distributed unit (DU) of the RAN node, the at least one UL TEID associated with the DRB;
receive, from the DU, at least one downlink TEID (DL TEID) associated with the DRB; and
send, to the CU-UP, the at least one DL TEID associated with the DRB.

13. The CU-CP of claim 12, wherein the at least one UL TEID and the at least one DL TEID are exchanged sequentially, such that the at least one UL TEID is received from the CU-UP and sent to the DU before the at least one DL TEID is received from the DU and sent to the CU-UP.

14. The CU-CP of claim 13, wherein execution of the instructions by the processing circuitry further configures the CU-CP to send a bearer setup request to the CU-UP, wherein the at least one UL TEID associated with the DRB is received from the CU-UP in a bearer set up response.

15. The CU-CP of claim 13, wherein:
the at least one UL TEID associated with the DRB is sent to the DU in a context setup request; and
the at least one DL TEID associated with the DRB is received from the DU in a context setup response.

16. The CU-CP of claim 13, wherein:
the at least one DL TEID associated with the DRB, as received from the DU, is sent to the CU-UP as a bearer modification request; and
execution of the instructions by the processing circuitry further configures the CU-CP to receive a bearer modification response from the CU-UP.

17. The CU-CP of claim 12, wherein the at least one UL TEID and the at least one DL TEID are exchanged sequentially, such that the at least one DL TEID is received from the DU and sent to the CU-UP before the at least one UL TEID is received from the CU-UP and sent to the DU.

18. The CU-CP of claim 17, wherein:
execution of the instructions by the processing circuitry further configures the CU-CP to, before receiving the at least one UL TEID associated with the DRB, send a temporary UL TEID associated with the DRB to the DU in a context setup request;
the at least one DL TEID associated with the DRB is received from the DU in a context setup response;
the at least one DL TEID associated with the DRB is sent to the CU-UP in a bearer setup request; and
the at least one UL TEID associated with the DRB is received from the CU-UP in a bearer setup response.

19. The CU-CP of claim 12, wherein the at least one UL TEID associated with the DRB and the at least one DL TEID associated with the DRB are exchanged in parallel between the CU-UP and the DU via the CU-CP.

20. The CU-CP of claim 19, wherein
execution of the instructions by the processing circuitry further configures the CU-CP to exchange the at least one UL TEID and the at least one DL TEID in parallel by sending a bearer setup request to the CU-UP and sending a UE context setup request to the DU, with the bearer setup request and the UE context setup request being sent at substantially the same time;
the at least one UL TEID associated with the DRB is received from the CU-UP in a bearer setup response;
the at least one DL TEID associated with the DRB is sent to the CU-UP in a bearer modification request;
the at least one DL TEID associated with the DRB is received from the DU in a context setup response; and
the at least one UL TEID associated with the DRB is sent to the DU in a UE context modification request.

21. The CU-CP of claim 12, wherein:
the at least one UL TEID comprises a plurality of UL TEIDs, each of the plurality of UL TEIDs being associated with a respective one of a plurality of DRBs, and
the at least one of DL TEID comprises a plurality of DL TEIDs, each of the plurality of DL TEIDs being associated with a respective one of the plurality of DRBs.

22. A method for allocating tunnel endpoint identifiers (TEIDs) by a radio access network (RAN) node, the method comprising:
- sending, by a Central Unit-Control Plane entity (CU-CP) of the RAN node, a bearer setup request to a Central Unit-User Plane entity (CU-UP) of the RAN node;
- receiving, by the CU-CP from the CU-UP, a bearer setup response comprising at least one uplink tunnel endpoints identifier (UL TEID) per bearer;
- sending, by the CU-CP to a distributed unit (DU) of the RAN node, a context setup request comprising the at least one UL TEID per bearer;
- receiving, by the CU-CP from the DU, a context setup response that includes at least one downlink tunnel endpoints identifier (DL TEID) per bearer;
- sending, by the CU-CP to the CU-UP, a bearer modification request that includes the at least one DL TEID per bearer as received from the DU; and
- receiving, by the CU-CP from the CU-UP, a bearer modification response.

23. A radio access network (RAN) node configured to allocate tunnel endpoint identifiers (TEIDs), the RAN node comprising:
- processing circuitry; and
- memory operable to store computer-executable instructions that, when executed by the processing circuitry, configure the RAN node to perform operations corresponding to the method of claim 22.

* * * * *